United States Patent
Honda

(10) Patent No.: US 11,535,749 B2
(45) Date of Patent: Dec. 27, 2022

(54) CURABLE COMPOSITION

(71) Applicant: DAIKIN INDUSTRIES, LTD., Osaka (JP)

(72) Inventor: Yoshiaki Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 57 days.

(21) Appl. No.: 16/757,816

(22) PCT Filed: Oct. 30, 2018

(86) PCT No.: PCT/JP2018/040406
§ 371 (c)(1),
(2) Date: Apr. 21, 2020

(87) PCT Pub. No.: WO2019/088133
PCT Pub. Date: May 9, 2019

(65) Prior Publication Data
US 2021/0230422 A1  Jul. 29, 2021

(30) Foreign Application Priority Data

Oct. 31, 2017  (JP) .............................. JP2017-211214

(51) Int. Cl.
| | | |
|---|---|---|
| *C08L 71/02* | (2006.01) | |
| *B01J 23/42* | (2006.01) | |
| *C08K 5/5419* | (2006.01) | |
| *C08L 83/04* | (2006.01) | |
| *C08G 65/22* | (2006.01) | |

(52) U.S. Cl.
CPC .............. *C08L 71/02* (2013.01); *B01J 23/42* (2013.01); *C08K 5/5419* (2013.01); *C08L 83/04* (2013.01); *C08G 65/226* (2013.01)

(58) Field of Classification Search
CPC ............................ C08G 65/007; C08G 65/226
See application file for complete search history.

(56) References Cited

U.S. PATENT DOCUMENTS

| | | | |
|---|---|---|---|
| 4,565,714 A | 1/1986 | Koshar | |
| 2011/0178263 A1 | 7/2011 | Koshikawa et al. | |
| 2015/0274960 A1* | 10/2015 | Fukuda ................... | C08L 71/02 525/102 |

FOREIGN PATENT DOCUMENTS

| | | |
|---|---|---|
| EP | 1 288 243 A1 | 3/2003 |
| JP | 61-12751 A | 1/1986 |
| JP | 2008-214566 A | 9/2008 |
| JP | 2011-168768 A | 9/2011 |
| JP | 2017-043685 A | 3/2017 |

OTHER PUBLICATIONS

Extended European Search Report dated Jul. 21, 2021 from the European Patent Office in counterpart EP Application No. 18873081.6.
International Preliminary Report on Patentability dated May 5, 2020 with translation of the Written Opinion English from the International Bureau in International Application No. PCT/JP2018/040406.
International Search Report for PCT/JP2018/040406, dated Dec. 25, 2018.
Chen Shichao et al, "Introduction to Rubber Technology and Manufacturing", Sinopec Press, First Edition, pp. 91-94, Sep. 2002.

* cited by examiner

*Primary Examiner* — Marc S Zimmer
(74) *Attorney, Agent, or Firm* — Sughrue Mion, PLLC

(57) ABSTRACT

A curable composition including (A) a compound having two or more alkenyl groups and a perfluoro(poly)ether group in one molecule, wherein the perfluoro(poly)ether group is represented by formula: $-(OC_6F_{12})_a-(OC_5F_{10})_b-(OC_4F_8)_c-(OC_3X^{10}{}_6)_d-(OC_2F_4)_e-(OCF_2)_f-$, a, b, c and d are each independently an integer of 0 to 30, e and f are each independently an integer of 1 to 200, the sum of a, b, c, d, e and f is at least 5, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or a chlorine atom, (B) an organosilicon compound which has two or more hydrogen atoms each bonding to a silicon atom, in one molecule, and (C) a catalyst.

9 Claims, No Drawings

CURABLE COMPOSITION

CROSS REFERENCE TO RELATED APPLICATIONS

This application is a National Stage of International Application No. PCT/JP2018/040406 filed Oct. 30, 2018, claiming priority based on Japanese Patent Application No. 2017-211214 filed Oct. 31, 2017.

TECHNICAL FIELD

The present invention relates to a curable composition.

BACKGROUND ART

A composition including a certain fluoropolyether-based compound has excellent water-repellency, oil-repellency, and the like. For example, Patent Literature 1 describes rubber where a cured film of a room temperature curing perfluoro(poly)ether composition is formed on the surface of the rubber, and describes the following: there is provided rubber to which releaseability, solvent resistance, chemical resistance, weather resistance, water-repellency, oil-repellency, and the like are imparted. Examples of Patent Literature 1 describe a composition using a compound having, as a perfluoro(poly)ether structure, $(OCF_2CF(CF_3))_mOCF_2CF_2O(CF(CF_3)CF_2O)_n$, wherein m+n=90.

Examples of Patent Literature 2 describe an addition-curing fluoropolyether-based adhesive composition including a linear polyfluoro compound having the same perfluoro(poly)ether structure $(OCF_2CF(CF_3))_mO(CF_2)_2O(CF(CF_3)CF_2O)_n$, wherein m+n=90, as that in Patent Literature 1 above. The linear polyfluoro compound of Patent Literature 2 has not only the perfluoro(poly)ether structure, but also two or more alkenyl groups, in one molecule. Patent Literature 2 describes the following: the composition enables a cured product having favorable adhesiveness to various metals or plastic base materials to be formed.

CITATION LIST

Patent Literatures

Patent Literature 1: JP 2008-214566 A
Patent Literature 2: JP 2011-168768 A

SUMMARY OF INVENTION

Technical Problem

In some field, for example, the field of a semiconductor manufacturing equipment, such a composition may be demanded to enable a cured product which is usable at a low temperature (for example, a temperature of 0° C. or less) to foe formed, depending on the application thereof. It, however, has been found according to studies by the present inventor that a cured product of the composition described in Examples of Patent Literature 1 or 2 may not keep the rubber properties when used at a low temperature and thus may be unsuitable for use at a low temperature. As a decomposed material formed by heating may be a contamination source, the cured product thereof may be demanded to be hardly decomposed at a high temperature.

An object of the present invention is to provide a curable composition which is suitable for forming a cured product suitable for use at a low temperature, for example, a cured product which has low elastic modulus ratio at a low temperature (for example, the ratio of the elastic modulus at −50° C. to the elastic modulus at 0° C.), and which is suitable for forming the cured product not easy to be decomposed at high temperature.

Solution to Problem

A first aspect of the present invention provides a curable composition including (A) a compound which is a compound having two or more alkenyl groups and a perfluoro(poly)ether group in one molecule, wherein the perfluoro(poly)ether group is a group represented by formula:

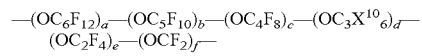

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or chlorine atom, (B) an organosilicon compound which has two or more hydrogen atoms each bonding to a silicon atom, in one molecule, and (C) a catalyst.

Advantageous Effects of Invention

The present invention can provide a curable composition which is suitable for forming a cured product suitable for use at a low temperature, for example, a cured product with low elastic modulus ratio at a low temperature (for example, the ratio of the elastic modulus at −50° C. to the elastic modulus at 0° C.), and the cured product which is hardly decomposed at a high temperature.

DESCRIPTION OF EMBODIMENTS

Hereinafter, the curable composition of the present invention will be described.

The divalent organic group, as used herein, means a divalent group containing carbon. The divalent organic group is not limited, and examples thereof include a divalent group where 1 to 9 hydrogen atoms are further removed from a hydrocarbon group. The divalent organic group is not limited, and examples thereof include a divalent group where one hydrogen atom is further removed from a hydrocarbon group.

The curable composition of the present invention includes (A) a compound which is a compound having two or more alkenyl groups and a perfluoro(poly)ether group in one molecule, wherein the perfluoro(poly)ether group is a group represented by formula:

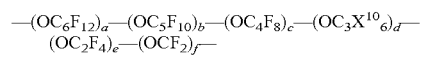

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, the ratio of e to f is 1.0 or more, and each $X^{10}$, at each occurrence, is independently a hydrogen atom, a fluorine atom or a chlorine atom (hereinafter, sometimes referred to as "PFPE-containing compound (A)"), (B) an organosilicon compound which has two or more hydrogen atoms each bonding to a silicon atom, in one molecule (hereinafter, sometimes referred to as "organosilicon compound (B)"), and (C) a catalyst.

(PFPE-Containing Compound (A))

The PFPE-containing compound (A) has two or more alkenyl groups, preferably two alkenyl groups, in one molecule.

The alkenyl group is preferably a group having 2 to 8 carbon atoms, more preferably a group having 2 to 6 carbon atoms. Examples of the alkenyl group can include a vinyl group, an allyl group, a propenyl group, an isopropenyl group, a butenyl group and a hexenyl group, particularly a vinyl group or an allyl group.

The alkenyl group is preferably present at each of both ends of a molecular backbone of the PFPE-containing compound (A). The molecular backbone here represents a relatively longest binding chain in a molecule of the PFPE-containing compound (A).

The perfluoro(poly)ether group is a group represented by formula:

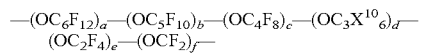

In the formula, a, b, c and d are each independently an integer of 0 or more and 30 or less, and e and f are each independently an integer of 1 or more and 200 or less, preferably 5 or more and 200 or less, more preferably 10 or more and 200 or less. Preferably, the sum of a, b, c, d, e and f is 5 or more, more preferably 10 or more, for example, 10 or more and 200 or less. The occurrence order of the respective repeating units in parentheses with the subscript a, b, c, d, e or f is not limited in the formula. The ratio of e to f (hereinafter, referred to as "e/f ratio") is 1.0 or more. Each $X^{10}$, at each occurrence, independently represents a hydrogen atom, a fluorine atom or a chlorine atom, preferably a hydrogen atom or a fluorine atom, more preferably a fluorine atom. Hereinafter, the perfluoro(poly)ether group having such a structure is sometimes referred to as "$PFPE^1$". The curable composition of the present invention comprises such $PFPE^1$, and thus a cured product of the curable composition can have a low glass transition temperature (Tg).

Here, a and b are each independently preferably 0 or more and 30 or less, and, for example, may be 0.

In one embodiment, a, b, c and d are each independently preferably an integer of 0 or more and 30 or less, more preferably an integer of 20 or less, particularly preferably an integer of 10 or less, further preferably an integer of 5 or less, or, for example, may be 0.

In one embodiment, the sum of a, b, c and d is preferably 30 or less, more preferably 20 or less, further preferably 10 or less, particularly preferably 5 or less.

In one embodiment, the sum of e and f is preferably 30 or more, more preferably 40 or more, further preferably 50 or more.

Such repeating units may, for example, be linear or branched, and are preferably linear. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, and is preferably $-(OCF_2CF_2CF_2CF_2CF_2CF_2)-$. For example, $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2CF_2)-$, $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, and is preferably $-(OCF_2CF_2CF_2CF_2)-$. $-(OC_3F_6)-$ (namely, in the formulae, $X^{10}$ represents a fluorine atom) may be any of $-(OCF_2CF_2CF_2)-$, $-(OCF(CF_3)CF_2)-$ and $-(OCF_2CF(CF_3))-$, and is preferably $-(OCF_2CF_2CF_2)-$, $-(OC_2F_4)-$ may be any of $-(OCF_2CF_2)-$ and $-(OCF(CF_3))-$, and is preferably $-(OCF_2CF_2)-$.

In one embodiment, $PFPE^1$ has a linear repeating unit. In the present embodiment, the molecular mobility of the PFPE-containing compound (A) is hardly decreased at a low temperature. A linear repeating unit is contained, thereby enabling a physical property value (for example, elastic modulus at a low temperature) of the PFPE-containing compound (A) to be hardly decreased as compared with a value at room temperature. Herein, the "elastic modulus" indicates dynamic elastic modulus, more specifically storage elastic modulus.

Preferably, $PFPE^1$ is $-(OC_4F_8)_c-(OC_3F_6)_d-(OC_2F_4)_e-(OCF_2)_f-$, wherein c and d are each independently an integer of 0 or more and 30 or less, e and f are each independently an integer of 1 or more and 200 or less, preferably 5 or more and 200 or less, more preferably 10 or more and 200 or less, and the occurrence order of the respective repeating units in parentheses with the subscript c, d, e or f is not limited in the formula. Preferably, $PFPE^1$ is $-(OCF_2CF_2CF_2CF_2)_c-(OCF_2CF_2CF_2)_d-(OCF_2CF_2)_e-(OCF_2)_f-$. In one embodiment, $PFPE^1$ may be $-(OCF_2F_4)_e-(OCF_2)_f-$, wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formulae.

More preferably, $PFPE^1$ is $-(OC_2F_4)_e-(OCF_2)_f-$, wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formula.

In $PFPE^1$, the ratio of the sum of e and f to the sum of a, b, c, d, e and f is preferably 0.80 or more, more preferably 0.90 or more, further preferably 0.98 or more, particularly preferably 0.99 or more.

In $PFPE^1$, the e/f ratio is preferably 1.0 or more, more preferably 1.1 or more, further preferably 1.2 or more. The e/f ratio is preferably 10.0 or less, more preferably 5.0 or less, further preferably 2.0 or less, particularly preferably 1.5 or less.

In $PFPE^1$, the e/f ratio is preferably 1.0 or more and 10.0 or less, more preferably 1.0 or more and 5.0 or less, further preferably 1.0 or more and 2.0 or less, particularly preferably 1.0 or more and 1.5 or less.

The curable composition of the present invention is hardly decomposed at a high temperature. The cured product being "hardly decomposed at a high temperature" is herein means that the temperature of 1% decomposition of the cured product is relatively high temperature. That is, the curable composition of the present invention can contribute to formation of a cured product usable in a wide temperature range. The "temperature of 1% decomposition" here means a temperature at which 1% by mass of a cured product relative to the entire cured product is decomposed. The temperature of 1% decomposition means a value obtained by measurement according to thermogravimetric/differential thermal analysis (TG/DTA), and is specifically measured in the range from 25° C. to 600° C. at a temperature-increasing rate of 10° C./min under an air atmosphere. Examples of the TG/DTA can include DTG-60 manufactured by Shimadzu Corporation.

A cured product of the curable composition of the present invention has above-mentioned $PFPE^1$, and thus can have an appropriate elastic modulus when used even at a low temperature (for example, the ratio of the elastic modulus at −50° C. to the elastic modulus at 0° C. can be decreased). Accordingly, the curable composition of the present invention can contribute to formation of a cured product which can keep rubber properties even at a low temperature, and the cured product can be suitable for use at a low temperature.

The number average molecular weight of the —$PFPE^1$- moiety can be in the range from 2,000 to 200,000, and is preferably in the range from 3,000 to 100,000. The number average molecular weight is defined as a value obtained by $^{19}$F-NMR measurement.

In one embodiment, the number average molecular weight of the —$PFPE^1$- moiety can be in the range from 2.000 to 10,000, and is preferably in the range from 2.000 to 3,000. Such a number average molecular weight of the —$PFPE^1$- moiety enables the curable composition to be low in viscosity and favorable in handleability. The curable composition having such a number average molecular weight of the —$PFPE^1$- moiety is also advantageous from the viewpoint of suppression of viscosity in the case where the composition is used with a solvent to be thereby formed into a solution.

In one embodiment/the number average molecular weight of the —$PFPE^1$- moiety can be in the range from 10/000 to 100,000, and is preferably in the range from 10/000 to 50,000. The compound can have such a number average molecular weight of the —$PFPE^1$- moiety to thereby allow the curable composition to be improved in physical properties such as stretching properties after curing.

The PFPE-containing compound (A) is preferably a compound represented by the following formula (I).

$$CH_2=CH-R^{k1}-PFPE^1-R^{k1}-CH=CH_2 \quad (I)$$

In formula (I), $PFPE^1$ has the same meaning as described above.

In formula (I), each $R^{k1}$, at each occurrence, independently represents a single bond or a divalent organic group.

$R^{k1}$ is understood to be a linker which links a perfluoro (poly)ether moiety (namely, —$PFPE^1$- moiety) mainly providing water-repellency, surface lubricity, and the like, and an alkenyl group. Accordingly, $R^{k1}$ may be a single bond or any organic group as long as the PFPE-containing compound (A) can be stably present. Herein, a left portion and a right portion of $R^{k1}$ are bonding to the group represented by $PFPE^1$ and the —CH=$CH_2$ moiety of formula (I), respectively.

In another embodiment, $R^{k1}$ can be $X^e$. $X^e$ represents a single bond or a divalent organic group, preferably represents a single bond or a divalent organic group having at least one selected from the group consisting of —$C_6H_4$—

(namely, -phenylene-, hereinafter, representing a phenylene group), —CO— (carbonyl group), —$NR^4$— and —$SO_2$—. Each $R^4$ independently represents a hydrogen atom, a phenyl group, or a $C_{1-6}$ alkyl group (preferably a methyl group), preferably represents a hydrogen atom or a methyl group. Such —$C_6H_4$—, —CO—, —$NR^4$— or —$SO_2$— is preferably contained in a molecular backbone of the PFPE-containing compound (A). The molecular backbone here represents a relatively longest binding chain in a molecule of the PFPE-containing compound (A).

$X^e$ more preferably represents a single bond or a divalent organic group having at least one selected from the group consisting of —$C_6H_4$—, —$CONR^4$—, —$CONR^4$—$C_6H_4$—, —CO—, —CO—$C_6H_4$—, —$SO_2NR^4$—, —$SO_2NR^6$—$C_6H_4$—, —$SO_2$—, and —$SO_2$—$C_6H_4$—. Such —$C_6H_4$—, —$CONR^4$—, —$CONR^4$—$C_6H_4$—, —CO—, —CO—$C_6H_4$—, —$SO_2NR^4$—, —$SO_2NR^4$—$C_6H_4$—, —$SO_2$—, or —$SO_2$—$C_6H_4$— is preferably contained in a molecular backbone of the PFPE-containing compound (A).

Examples of $R^{k1}$ are not limited, and include a divalent group represented by the following formula:

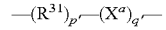
$$-(R^{31})_{p'}-(X^a)_{q'}-$$

wherein:
$R^{31}$ represents a single bond, —$(CH_2)_{s'}$—, or an o-, m- or p-phenylene group, preferably represents —$(CH_2)_{s'}$—, s' is an integer of 1 to 20, preferably an integer of 1 to 6, more preferably an integer of 1 to 3, still more preferably 1 or 2, $X^a$ represents, —$(X^b)_{l'}$—, each $X^b$, at each occurrence, independently represents a group selected from the group consisting of —O—, —S—, o-, m- or p-phenylene group, —C(O)O—, —Si$(R^{33})_2$—, —(Si$(R^{33})_2$O$)_{m'}$—Si$(R^{33})_2$—, —$CONR^{34}$—, —O—$CONR^{34}$—, —$NR^{34}$— and —$(CH_2)_{n'}$—, each $R^{33}$, at each occurrence, independently represents a phenyl group, a $C_{1-6}$ alkyl group or a $C_{1-6}$ alkoxy group, preferably represents a phenyl group or a $C_{1-6}$ alkyl group, more preferably represents a methyl group, each $R^{34}$, at each occurrence, independently represents a hydrogen atom, a phenyl group, or a $C_{1-6}$ alkyl group (preferably a methyl group), each m', at each occurrence, is independently an integer of 1 to 100, preferably an integer of 1 to 20, each n', at each occurrence, is independently an integer of 1 to 20, preferably an integer of 1 to 6, more preferably an integer of 1 to 3, l' is an integer of 1 to 10, preferably an integer of 1 to 5, more preferably an integer of 1 to 3, p' is 0 or 1, and q' is 0 or 1, provided that at least one of p' and q' is 1, and the occurrence order of the respective repeating units in parentheses with p' or q' is not limited. Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

In one embodiment, l' is 1.

Preferably, $R^{k1}$ is —$(R^{31})_{p'}$—$(X^a)_{q'}$—$R^{32}$—. $R^{32}$ represents a single bond, —$(CH_2)_{t'}$—, or an o-, m- or p-phenylene group, preferably —$(CH_2)_{t'}$—. Here, t' is an integer of 1 to 20, preferably an integer of 2 to 6, more preferably an integer of 2 to 3. In one embodiment, t' is an integer of 1 to 6, more preferably an integer of 1 to 3, for example, 1 or 2, more specifically l. Here, $R^{32}$ (typically, any hydrogen atom in $R^{32}$) is optionally substituted with one or more substituents selected from a fluorine atom, a $C_{1-3}$ alkyl group and a $C_{1-3}$ fluoroalkyl group.

Preferably, $R^{k1}$ can be
a single bond,
a $C_{1-20}$ alkylene group,
—$R^{31}$—$X^c$—$R^{32}$—, or
—$X^d$—$R^{32}$—
wherein $R^{31}$ and $R^{32}$ have the same meanings as described above. Herein, such an alkylene group is a group having a —($C_\delta H_{2\delta}$)— structure, and is optionally substituted or unsubstituted and is optionally linear or branched.

More preferably, $R^{k1}$ is
a single bond,
a $C_{1-20}$ alkylene group,
—$(CH_2)_{s'}$—$X^c$—,
—$(CH_2)_{s'}$—$X^c$—$(CH_2)_{t'}$—,
—$X^d$—, or
—$X^d$—$(CH_2)_{t'}$—
wherein s' and t' have the same meanings as described above.

Further preferably, $R^{k1}$ is
—$X^f$—,
a —$X^f$—$C_{1-20}$ alkylene group,
—$X^f$—$(CH_2)_{s'}$—$X^c$—,
—$X^f$—$(CH_2)_{s'}$—$X^c$—$(CH_2)_{t'}$—,
—$X^f$—$X^d$—, or
—$X^f$—$X^d$—$(CH_2)_{t'}$—
wherein s' and t' have the same meanings as described above.

In the formulae, $X^f$ is an alkylene group having 1 to 6 carbon atoms, preferably 1 to 4 carbon atoms, more preferably 1 to 2 carbon atoms, for example, a methylene group. Any hydrogen atom in $X^f$ is optionally substituted with one or more substituents selected from a fluorine atom, a $C_{1-3}$ alkyl group and a $C_{1-3}$ fluoroalkyl group, and is preferably substituted. $X^f$ may be linear or branched, and is preferably linear.

In the formulae, $X^c$ represents
—O—,
—S—,
—C(O)O—,
—CONR$^{34}$—,
—O—CONR$^{34}$—,
—Si(R$^{33}$)$_2$—,
—(Si(R$^{33}$)$_2$O)$_{m'}$—Si(R$^{33}$)$_2$—,
—O—(CH$_2$)$_{u'}$—(Si(R$^{33}$)$_2$O)$_{m'}$—Si(R$^{33}$)$_2$—,
—O—(CH$_2$)$_{u'}$—Si(R$^{33}$)$_2$—O—Si(R$^{33}$)$_2$—CH$_2$CH$_2$—Si(R$^{33}$)$_2$—O—Si(R$^{33}$)$_2$—,
—O—(CH$_2$)$_{u'}$—Si(OCH$_3$)$_2$OSi(OCH$_3$)$_2$—,
—CONR$^{34}$—(CH$_2$)$_{u'}$—(Si(R$^{33}$)$_2$O)$_{m'}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein $R^{33}$, $R^{34}$ and m' have the same meanings as described above, and
u' is an integer of 1 to 20, preferably an integer of 2 to 6, more preferably an integer of 2 to 3. $X^c$ is preferably —O—.

In the formulae, $X^d$ represents
—S—,
—C(O)O—,
—CONR$^{34}$—,
—CONR$^{34}$—(CH$_2$)$_{u'}$—(Si(R$^{33}$)$_2$O)$_{m'}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein each symbol has the same meaning as described above.

Particularly preferably, $R^{k1}$ is a group represented by
—$X^f$—,
a —$X^f$—$C_{1-20}$ alkylene group,
—$X^f$—$(CH_2)_{s'}$—$X^c$—,
—$X^f$—$(CH_2)_{s'}$—$X^c$—$(CH_2)_{t'}$—,
—$X^f$—$X^d$—, or
—$X^f$—$X^d$—$(CH_2)_{t'}$—
wherein $X^f$, s' and t' have the same meanings as described above;
$X^c$ represents —O—, or —CONR$^{34}$—,
$X^d$ represents —CONR$^{34}$—, and
each $R^{34}$, at each occurrence, independently represents a hydrogen atom, a phenyl group, or a $C_{1-6}$ alkyl group (preferably a methyl group).

In one embodiment, $R^{k1}$ is a group represented by
—$X^f$—$(CH_2)_{s'}$—$X^c$—,
—$X^f$—$(CH_2)_{s'}$—$X^c$—$(CH_2)_{t'}$—,
—$X^f$—$X^d$—, or
—$X^f$—$X^d$—$(CH_2)_{t'}$—
wherein $X^f$, s' and t' have the same meanings as described above;
$X^c$ represents —O— or —CONR$^{34}$—,
$X^d$ represents —CONR$^{34}$—, and
each $R^{34}$, at each occurrence, independently represents a hydrogen atom, a phenyl group or a $C_{1-6}$ alkyl group (preferably a methyl group).

In one embodiment, $R^{k1}$ can be,
a single bond,
a $C_{1-20}$ alkylene group,
—$(CH_2)_{s'}$—$X^c$—$(CH_2)_{t'}$—, or
—$X^d$—$(CH_2)_{t'}$—
wherein each symbol has the same meaning as described above.

Preferably, $R^{k1}$ is
a single bond,
$C_{1-2}$ alkylene group,
—$(CH_2)_{s'}$—O—$(CH_2)_{t'}$—,
—$(CH_2)_{s'}$—(Si(R$^{33}$)$_2$O)$_{m'}$—Si(R$^{33}$)$_2$—$(CH_2)_{t'}$—,
—$(CH_2)_{s'}$—O—$(CH_2)_{u'}$—(Si(R$^{33}$)$_2$O)$_{m'}$—Si(R$^{33}$)$_2$—$(CH_2)_{t'}$—, or
—$(CH_2)_{s'}$—O—$(CH_2)_{t'}$—Si(R$^{33}$)$_2$—$(CH_2)_{u'}$—Si(R$^{33}$)$_2$—$(C_v H_{2v})$—
wherein $R^{33}$, m', s', t' and u' have the same meanings as described above, and v is an integer of 1 to 20, preferably an integer of 2 to 6, more preferably an integer of 2 to 3.

In the formulae, —$(C_v H_{2v})$— is optionally linear or branched, and can be, for example, —CH$_2$—, —CH$_2$CH$_2$—, —CH$_2$CH$_2$CH$_2$—, —CH(CH$_3$)— or —CH(CH$_3$)CH$_2$—.

The $R^{k1}$ group is optionally substituted with one or more substituents selected from a fluorine atom, a $C_{1-3}$ alkyl group and a $C_{1-3}$ fluoroalkyl group (preferably $C_{1-3}$perfluoroalkyl group).

In one embodiment, the $R^{k1}$ group can be other than a —O—$C_{1-6}$ alkylene group.

In another embodiment, examples of the $R^{k1}$ group include the following groups:

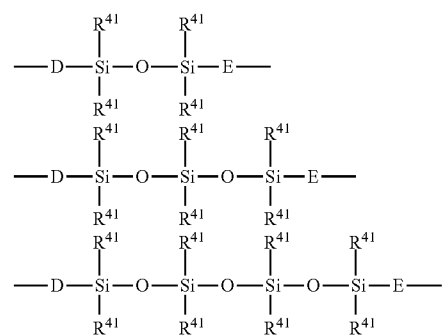

-continued

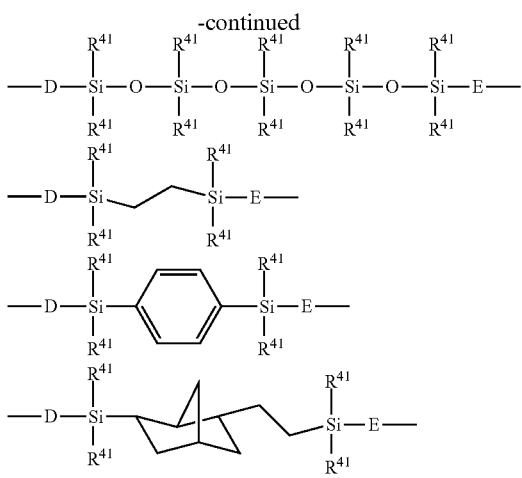

wherein each $R^{41}$ independently represents a hydrogen atom, a phenyl group, an alkyl group having 1 to 6 carbon atoms, or a $C_{1-6}$ alkoxy group, preferably a methyl group:

D is a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—$CONH$—$(CH_2)_3$—,
—$CON(CH_3)$—$(CH_2)_3$—,
$CON(Ph)$-$(CH_2)_3$—, wherein Ph means phenyl, and

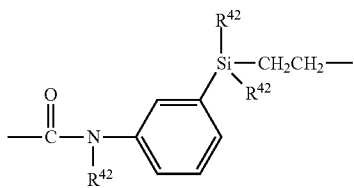

wherein each $R^{42}$ independently represents a hydrogen atom, a $C_{1-6}$ alkyl group or a $C_{1-6}$ alkoxy group, preferably a methyl group or a methoxy group, more preferably a methyl group;

E is —$(CH_2)_{ne}$— (ne is an integer of 2 to 6),

D is bonding to $PFPE^1$ of a molecular backbone, and E is bonding to a group opposite to $PFPE^1$.

Specific examples of $R^{k1}$ include:
a single bond,
—$CH_2OCH_2$—,
—$CH_2O(CH_2)_2$—,
—$CH_2O(CH_2)_3$—,
—$CH_2O(CH_2)_4$—,
—$CF_2$—$CH_2$—$O$—$CH_2$—,
—$CF_2$—$CH_2$—$O$—$(CH_2)_2$—,
—$CF_2$—$CH_2$—$O$—$(CH_2)_3$—,
—$CF_2$—$CH_2$—$O$—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_3)_3Si(CH_3)_2O(Si(CH_3)_2O)_{10}Si(CH_3)_2(CH_2)_2$—,
—$CH_2O(CH_3)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_3$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_3$—,
—$CH_2OCH_2CHFCF_2OCF(CF_3)CF_2OCF_2CF_2CF_2$—,
—$CH_2OCF_2CHFOCF_2CF_2CF_2$—$C(O)NH$—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—$CO$—,
—$CONH$—,
—$CONH$—$CH_2$—,
—$CONH$—$(CH_2)_2$—,
—$CONH$—$(CH_2)_3$—,
—$CONH$—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CON(CH_3)$—$(CH_2)_3$—,
—$CON(Ph)$-$(CH_2)_3$—, wherein Ph means phenyl,
—$CON(CH_3)$—$(CH_2)_6$—,
—$CON(Ph)$-$(CH_2)_6$—, wherein Ph means phenyl,
—$CF_2$—$CON(CH_3)$—$(CH_2)_3$—,
—$CF_2$—$CON(Ph)$-$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—$CONH$—$(CH_2)_2NH(CH_2)_3$—,
—$CONH$—$(CH_2)_6NH(CH_2)_3$—,
—$CH_2O$—$CONH$—$(CH_2)_3$—,
—$CH_2O$—$CONH$—$(CH_2)_6$—,
—$S$—$(CH_2)_3$—,
—$(CH_2)_2S(CH_2)_3$—,
—$CONH$—$(CH_2)_3Si(CH_3)_2OSi(CH_3)_2(CH_2)_2$—, —CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

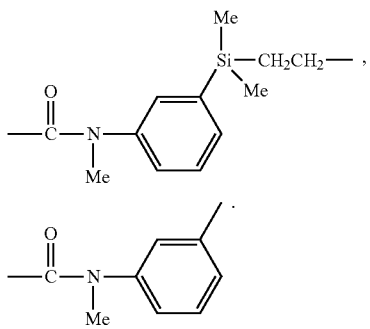

In particular, $R^{k1}$ is preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_3$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, where Ph means phenyl
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In the above list, examples of further preferable $R^{k1}$ preferably include
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—, —$CF_2CONHCH_2$—,
—$CF_2CONH(CH_2)_2$—,
—$CF_2CONH(CH_2)_3$—,
—$CF_2CONH(CH_2)_6$—,
—$CON(CH_3)$—$(CH_2)_3$—,
—$CON(Ph)$-$(CH_2)_3$—, wherein Ph means phenyl,
—$CON(CH_3)$—$(CH_2)_6$—,
—$CON(Ph)$-$(CH_2)_6$—, wherein Ph means phenyl,
—$CF_2$—$CON(CH_3)$—$(CH_2)_3$—,
—$CF_2$—$CON(Ph)$-$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—$CONH$—$(CH_2)_2NH(CH_2)_3$—,
—$CONH$—$(CH_2)_6NH(CH_2)_3$—.

In one embodiment, $R^{k1}$ represents $X^{e'}$, $X^{e'}$ is a single bond, an alkylene group having 1 to 6 carbon atoms, —$R^{51}$—$C_6H_4$—$R^{52}$—, —$R^{51}$—$CONR^4$—$R^{52}$—, —$R^{51}$—$CONR^4$—$C_6H_4$—$R^{52}$—, —$R^{51}$—$CO$—$R^{52}$—, —$R^{51}$—$CO$—$C_6H_4$—$R^{52}$—, —$R^{51}$—$SO_2NR^4$—$R^{52}$—, —$R^{51}$—$SO_2NR^4$—$C_6H_4$—$R^{52}$—, —$R^{51}$—$SO_2$—$R^{52}$—, or —$R^{51}$—$SO_2$—$C_6H_4$—$R^{52}$—. $R^{51}$ and $R^{52}$ each independently represent a single bond or an alkylene group having 1 to 6 carbon atoms, preferably a single bond or an alkylene group having 1 to 3 carbon atoms. $R^4$ has the same meaning as described above. The alkylene group is substituted or unsubstituted, preferably unsubstituted. Examples of the substituent of the alkylene group can include a halogen atom, preferably a fluorine atom. The alkylene group is linear or branched, preferably linear.

In a preferable embodiment, $X^{e'}$ can be a single bond,
—$X^f$—,
an alkylene group having 1 to 6 carbon atoms, preferably 1 to 3 carbon atoms
a —$X^f$—$C_{1-6}$ alkylene group, preferably a —$X^f$—$C_{1-3}$ alkylene group, more preferably
a —$X^f$—$C_{1-2}$ alkylene group,
—$C_6H_4$—$R^{52'}$—,
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$CO$—$R^{52'}$—,
—$CO$—$C_6H_4$—$R^{52'}$—,
—$SO_2NR^{4'}$—$R^{52'}$—,
—$SO_2NR^{4'}$—$C_6H_4$—$R^{52'}$—,
—$SO_2$—$R^{52'}$—,
—$SO_2$—$C_6H_4$—$R^{52'}$—,
—$R^{51'}$—$C_6H_4$—,
—$R^{51'}$—$CONR^{4'}$—,
—$R^{51'}$—$CONR^{4'}$—$C_6H_4$—,
—$R^{51'}$—$CO$—,
—$R^{51'}$—$CO$—$C_6H_4$—,
—$R^{51'}$—$SO_2NR^{4'}$—,
—$R^{51'}$—$SO_2NR^{4'}$—$C_6H_4$—,
—$R^{51'}$—$SO_2$—,
—$R^{51'}$—$SO_2$—$C_6H_4$—,
—$C_6H_4$—,
—$CONR^{4'}$—,
—$CONR^{4'}$—$C_6H_4$—,
—$X^f$—$CONR^{4'}$—,
—$X^f$—$CONR^{4'}$—$C_6H_4$—,
—$CO$—,
—$CO$—$C_6H_4$—,
—$SO_2NR^{4'}$—,
—$SO_2NR^{4'}$—$C_6H_4$—,
—$SO_2$—, or
—$SO_2$—$C_6H_4$— wherein $R^{51'}$ and $R^{52'}$ each independently a linear alkylene group having 1 to 6 carbon atoms, preferably 1 to 3 carbon atoms, the alkylene group is substituted or unsubstituted, as described above, and examples of the substituent of the alkylene group can include a halogen atom, preferably a fluorine atom, and $R^{4'}$ is a hydrogen atom or a methyl group.

In particular, $X^{e'}$ can be preferably —$X^f$—,
an alkylene group having 1 to 6 carbon atoms, preferably 1 to 3 carbon atoms, or
a —$X^f$—$C_{1-6}$ alkylene group, preferably a —$X^f$—$C_{1-6}$ alkylene group, more preferably
a —$X^f$—$C_{1-2}$ alkylene group,
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$CONR^{4'}$—,
—$CONR^{4'}$—$C_6H_4$—,
—$X^f$—$CONR^{4'}$—,
—$X^f$—$CONR^{4'}$—$C_6H_4$—,
—$R^{51'}$—$CONR^{4'}$—, or
—$R^{51'}$—$CONR^{4'}$—$C_6H_4$—. In the formulae, $X^f$, $R^{4'}$, $R^{51'}$ and $R^{52'}$ each have the same meanings as described above.

In particular, $X^{e'}$ can be more preferably
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$CONR^{4'}$—,
—$CONR^{4'}$—$C_6H_4$—,
—$X^f$—$CONR^{4'}$—, or
—$X^f$—$CONR^{4'}$—$C_6H_4$—.

Specific examples of $X^{e'}$ in the present embodiment include
a single bond,
a perfluoroalkylene group having 1 to 6 carbon atoms (for example, —$CF_2$— and —$(CF_2)_2$—),
an alkylene group having 1 to 6 carbon atoms,
a —$CF_2$—$C_{1-6}$ alkylene group,
—$CONH$—,
—$CONH$—$CH_2$—,
—$CONH$—$(CH_2)_2$—,
—$CONH$—$(CH_2)_3$—,
—$CF_2$—$CONH$—,
—$CF_2CONHCH_2$—,
—$CF_2CONH(CH_2)_2$—,
—$CF_2CONH(CH_2)_3$—,
—$CON(CH_3)$—,
—$CON(CH_3)$—$CH_2$—,
—$CON(CH_3)$—$(CH_2)_2$—,
—$CON(CH_3)$—$(CH_2)_3$—,
—$CF_2$—$CON(CH_3)$—,
—$CF_2$—$CON(CH_3)CH_2$—,
—$CF_2$—$CON(CH_3)$—$(CH_2)_2$—,
—$CF_2$—$CON(CH_3)$—$(CH_2)_3$—,
—$CH_2$—$CONH$—,
—$CH_2$—$CONH$—$CH_2$—,
—$CH_2$—$CONH$—$(CH_2)_2$—,
—$CH_2$—$CONH$—$(CH_2)_3$—,
—$CF_2$—$CH_2$—$CONH$—,
—$CF_2$—$CH_2$—$CONH$—$CH_2$—,
—$CF_2$—$CH_2$—$CONH$—$(CH_2)_2$—, —$CF_2$—$CH_2$—CONH—$(CH_2)_3$—,
—CONH—$C_6H_4$—,
—CON($CH_3$)—$C_6H_4$—,
—$CH_2$—CON($CH_3$)—$CH_2$—,
—$CH_2$—CON($CH_3$)—$(CH_2)_2$—,
—$CH_2$—CON($CH_3$)—$(CH_2)_3$—,
—CON($CH_3$)—$C_6H_4$—,
—$CF_2$—CONH—$C_6H_4$—,
—$CF_2$—CON($CH_3$)—$C_6H_4$—,
—$CF_2$—$CH_2$—CON($CH_3$)—$CH_2$—,
—$CF_2$—$CH_2$—CON($CH_3$)—$(CH_2)_2$—,
—$CF_2$—$CH_2$—CON($CH_3$)—$(CH_2)_3$—,
—$CF_2$—CON($CH_3$)—$C_6H_4$—,
—CO—,
—CO—$C_6H_4$—,
—$C_6H_4$—,
—$SO_2$NH—,
—$SO_2$NH—$CH_2$—,
—$SO_2$NH—$(CH_2)_2$—,
—$SO_2$NH—$(CH_2)_3$—,
—$SO_2$NH—$C_6H_4$—,
—$SO_2$N($CH_3$)—,
—$SO_2$N($CH_3$)—$CH_2$—,
—$SO_2$N($CH_3$)—$(CH_2)_2$—,
—$SO_2$N($CH_3$)—$(CH_2)_3$—,
—$SO_2$N($CH_3$)—$C_6H_4$—,
—$SO_2$—,
—$SO_2$—$CH_2$—,
—$SO_2$—$(CH_2)_2$—,
—$SO_2$—$(CH_2)_3$—, or
—$SO_2$—$C_6H_4$—.

In the above list, examples of preferable $X^{e'}$ include a perfluoroalkylene group having 1 to 6 carbon atoms (for example, —$CF_2$— and —$(CF_2)_2$—),
an alkylene group having 1 to 6 carbon atoms,
a —$CF_2$—$C_{1-6}$ alkylene group,
—CONH—,
—CONH—$CH_2$—,
—CONH—$(CH_2)_2$—,
—CONH—$(CH_2)_3$—,
—$CF_2$CONH—,
—$CF_2$CONH$CH_2$—,
—$CF_2$CONH$(CH_2)_2$—,
—$CF_2$CONH$(CH_2)_3$—,
—CON($CH_3$)—,
—CON($CH_3$)—$CH_2$—,
—CON($CH_3$)—$(CH_2)_2$—,
—CON($CH_3$)—$(CH_2)_3$—,
—$CF_2$—CON($CH_3$)—,
—$CF_2$—CON($CH_3$)$CH_2$—,
—$CF_2$—CON($CH_3$)—$(CH_2)_2$—,
—$CF_2$—CON($CH_3$)—$(CH_2)_3$—,
—$CH_2$—CONH—,
—$CH_2$—CONH—$CH_2$—,
—$CH_2$—CONH—$(CH_2)_2$—,
—$CH_2$—CONH—$(CH_2)_3$—,
—$CF_2$—$CH_2$—CONH—,
—$CF_2$—$CH_2$—CONH—$CH_2$—,
—$CF_2$—$CH_2$—CONH—$(CH_2)_2$—,
—$CF_2$—$CH_2$—CONH—$(CH_2)_3$—,
—CONH—$C_6H_4$—,
—CON($CH_3$)—$C_6H_4$—,
—$CH_2$—CON($CH_3$)—$CH_2$—,
—$CH_2$—CON($CH_3$)—$(CH_2)_2$—,
—$CH_2$—CON($CH_3$)—$(CH_2)_3$—,
—CON($CH_3$)—$C_6H_4$—
—$CF_2$—CONH—$C_6H_4$—,
—$CF_2$—CON($CH_3$)—$C_6H_4$—,
—$CF_2$—$CH_2$—CON($CH_3$)—$CH_2$—,
—$CF_2$—$CH_2$—CON($CH_3$)—$(CH_2)_2$—,
—$CF_2$—$CH_2$—CON($CH_3$)—$(CH_2)_3$—, and
—$CF_2$—CON($CH_3$)—$C_6H_4$—.

In the above list, examples of more preferable $X^{e'}$ include
—CONH—,
—CONH—$CH_2$—,
—CONH—$(CH_2)_2$—,
—CONH—$(CH_2)_3$—,
—$CF_2$CONH—,
—$CF_2$CONH$CH_2$—,
—$CF_2$CONH$(CH_2)_2$—,
—$CF_2$CONH$(CH_2)_3$—,
—CON($CH_3$)—,
—CON($CH_3$)—$CH_2$—,
—CON($CH_3$)—$(CH_2)_2$—,
—CON($CH_3$)—$(CH_2)_3$—,
—$CF_2$—CON($CH_3$)—,
—$CF_2$—CON($CH_3$)$CH_2$—,
—$CF_2$—CON($CH_3$)—$(CH_2)_2$—,
—$CF_2$—CON($CH_3$)—$(CH_2)_3$—,
—$CH_2$—CONH—,
—$CH_2$—CONH—$CH_2$—,
—$CH_2$—CONH—$(CH_2)_2$—,
—$CH_2$—CONH—$(CH_2)_3$—,
—$CF_2$—$CH_2$—CONH—,
—$CF_2$—$CH_2$—CONH—$CH_2$—,
—$CF_2$—$CH_2$—CONH—$(CH_2)_2$—,
—$CF_2$—$CH_2$—CONH—$(CH_2)_3$—,
—CONH—$C_6H_4$—,
—CON($CH_3$)—$C_6H_4$—,
—$CH_2$—CON($CH_3$)—$CH_2$—,
—$CH_2$—CON($CH_3$)—$(CH_2)_2$—,
—$CH_2$—CON($CH_3$)—$(CH_2)_3$—,
—CON($CH_3$)—$C_6H_4$—
—$CF_2$—CONH—$C_6H_4$—,
—$CF_2$—CON($CH_3$)—$C_6H_4$—,
—$CF_2$—$CH_2$—CON($CH_3$)—$CH_2$—,
—$CF_2$—$CH_2$—CON($CH_3$)—$(CH_2)_2$—,
—$CF_2$—$CH_2$—CON($CH_3$)—$(CH_2)_3$—, or
—$CF_2$—CON($CH_3$)—$C_6H_4$—.

In one embodiment, $X^{e'}$ is a single bond. In the present embodiment, $PFPE^1$ and a group having a binding ability to the base material are directly bonded.

In still another embodiment, $R^{k1}$ is a group represented by formula: —$(R^{16})_x$—$(CFR^{17})_y$—$(CH_2)_z$—. In the formula, x, y and z are each independently an integer of 0 to 10, the sum of x, y and z is 1 or more, and the occurrence order of the respective repeating units in parentheses is not limited in the formula.

In the formula, each $R^{16}$, at each occurrence, independently represents an oxygen atom, phenylene, carbazolylene, —$NR^{18}$—, wherein $R^{18}$ represents a hydrogen atom or an organic group, or a divalent organic group. Preferably, $R^{16}$ is an oxygen atom or a divalent polar group.

The "divalent polar group" is not limited, and examples thereof include —C(O)—, —C($=NR^{19}$)—, and —C(O)$NR^{19}$—, wherein $R^{19}$ represents a hydrogen atom or a lower alkyl group. The "lower alkyl group" is, for example, an alkyl group having 1 to 6 carbon atoms, such as a methyl group, an ethyl group, or a n-propyl group, and such a group is optionally substituted with one or more fluorine atoms.

In the formula, each $R^{17}$, at each occurrence, is independently a hydrogen atom, a fluorine atom or a lower fluoroalkyl group, preferably a fluorine atom. The "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, further preferably a trifluoromethyl group.

In this embodiment, $R^{k1}$ is preferably a group represented by formula: $-(O)_x-(CF_2)_y-(CH_2)_z-$, wherein x, y and z have the same meanings as described above, and the occurrence order of the respective repeating units in parentheses is not limited in the formula.

Examples of the group represented by formula: $-(O)_x-(CF_2)_y-(CH_2)_z-$ include any group represented by $-(O)_{x'}-(CH_2)_{z''}-O-[(CH_2)_{z'''}-O-]_{z''''}$, and $-(O)_{x'}-(CF_2)_{y''}-(CH_2)_{x''}-O-[(CH_2)_{z'''}-O-]_{z''''}$, wherein x' is 0 or 1, y", z" and z''' are each independently an integer of 1 to 10, and z'''' is 0 or 1. Herein, a left end of such a group is bonding to PFPE.

In another preferable embodiment, $R^{k1}$ is $-O-CFR^{20}-(CF_2)_{e'''}-$.

Each $R^{20}$ independently represents a fluorine atom or a lower fluoroalkyl group. The lower fluoroalkyl group is, for example, a fluoroalkyl group having 1 to 3 carbon atoms, preferably a perfluoroalkyl group having 1 to 3 carbon atoms, more preferably a trifluoromethyl group or a pentafluoroethyl group, further preferably a trifluoromethyl group.

Each e''' is independently 0 or 1.

In one specific example, $R^{20}$ is a fluorine atom and e''' is 1.

In still another embodiment, examples of the $R^{k1}$ group include the following groups:

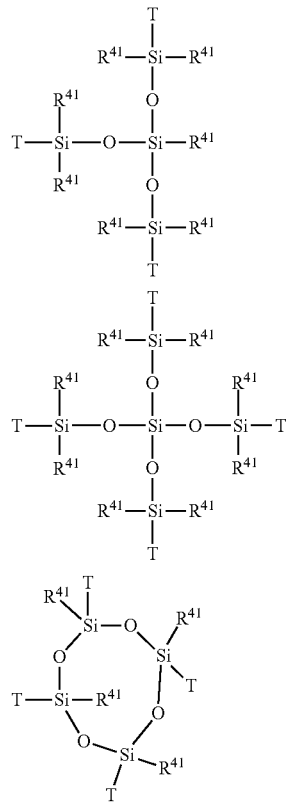

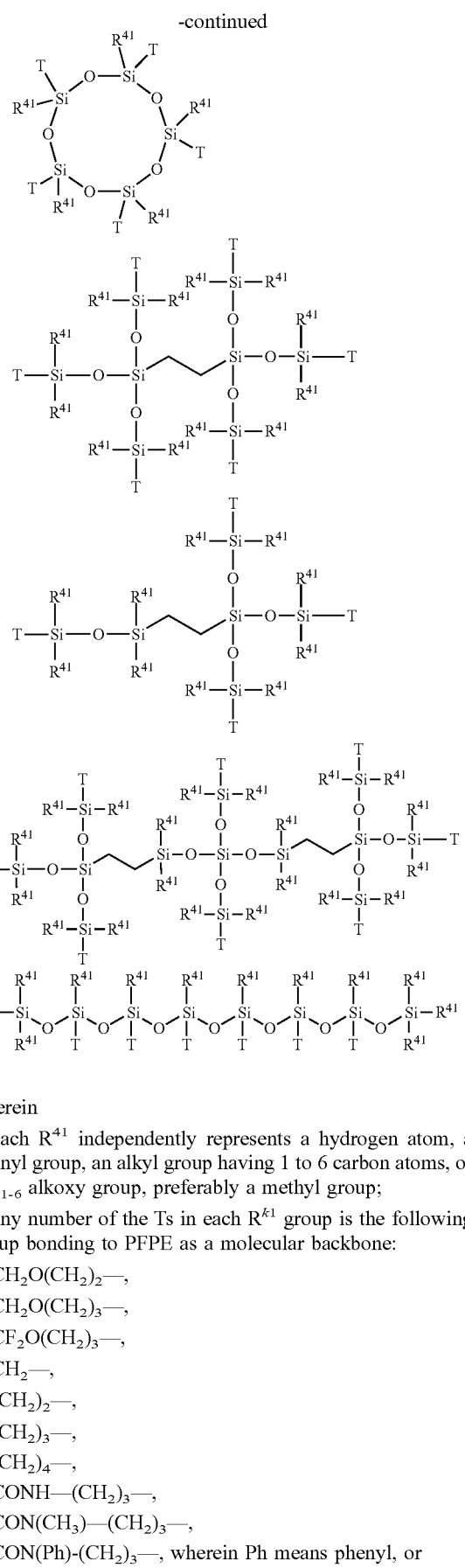

wherein each $R^{41}$ independently represents a hydrogen atom, a phenyl group, an alkyl group having 1 to 6 carbon atoms, or a $C_{1-6}$ alkoxy group, preferably a methyl group;

any number of the Ts in each $R^{k1}$ group is the following group bonding to PFPE as a molecular backbone:

—$CH_2O(CH_2)_2$—,

—$CH_2O(CH_2)_3$—,

—$CF_2O(CH_2)_3$—,

—$CH_2$—,

—$(CH_2)_2$—,

—$(CH_2)_3$—,

—$(CH_2)_4$—,

—$CONH$—$(CH_2)_3$—,

—$CON(CH_3)$—$(CH_2)_3$—,

—$CON(Ph)$-$(CH_2)_3$—, wherein Ph means phenyl, or

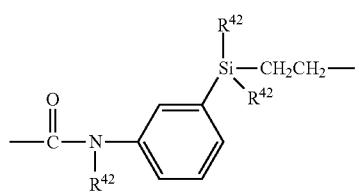

wherein each $R^{42}$ independently represents a hydrogen atom, a $C_{1-6}$ alkyl group or a $C_{1-6}$ alkoxy group, preferably a methyl group or a methoxy group, more preferably a methyl group, another of the Ts is —$(CH_2)_{n''}$— (n'' is an integer of 2 to 6) bonding to a group opposite to PFPE as a molecular backbone, and the remaining of the Ts, if present, can be independently a methyl group, a phenyl group, a $C_{1-6}$ alkoxy group, or a radical scavenging group or an UV absorbing group.

The radical scavenging group is not limited as long as it can scavenge a radical generated by light irradiation, and examples thereof include a residue of benzophenones, benzotriazoles, benzoates, phenyl salicylates, crotonic acids, malonates, organoacrylates, hindered amines, hindered phenols, or triazines.

The UV absorbing group is not limited as long as it can absorb ultraviolet light, and examples thereof include residue of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferable embodiment, examples of a preferable radical scavenging group or an absorbing group include

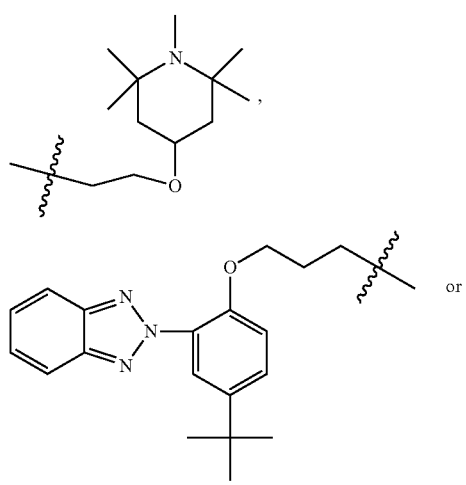

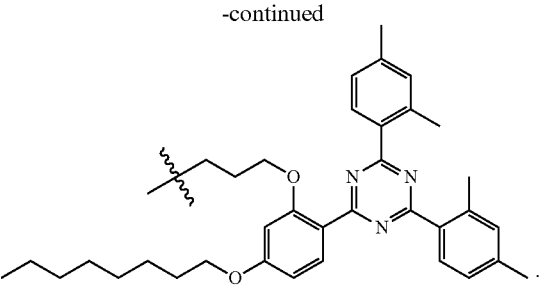

In one embodiment examples of $R^{k1}$ can include any group represented by —$R^{k2}$—$CH_2$—, —$R^{k2}$—$OCH_2$—, —$R^{k2}$—$CH_2OCH_2$—, or —$R^{k2}$—CO—$NR^1$—$Y^{j2}$—. A left portion of the formula of the divalent organic group (namely, $R^{k2}$ portion) is bonding to PFPE$^1$.

In the embodiment, $R^{k2}$ is a single bond or a divalent hydrocarbon group having 1 to 15 carbon atoms, and may contain an ether bond. Examples of the hydrocarbon group in $R^{k2}$ can include an alkylene group or an alkylene group optionally containing ether oxygen. The alkylene group is optionally substituted or unsubstituted, as described above.

In one embodiment, $R^{k2}$ is a single bond. In another embodiment, examples of $R^{k2}$ can include a divalent hydrocarbon group, preferably an alkylene group where any hydrogen atom is at least partially substituted with a fluorine atom, such as —CFH—, —$CF_2$—, —$(CF_2)_2$— or —$(CF_2)_3$—, specifically —$CF_2$—.

In the embodiment, $Y^{j2}$ is —$CH_2$—, or an o, m or p-dimethylailylphenylene group represented by the following formula. In the following formula, a phenylene group is bonding to a N atom and a Si atom is bonding to a —CH=$CH_2$ group in formula (I), respectively.

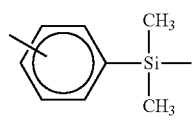

In the embodiment, $R^1$ is a hydrogen atom or a substituted or unsubstituted monovalent hydrocarbon group. The substituted or unsubstituted monovalent hydrocarbon group is preferably a monovalent hydrocarbon group having 1 to 12 carbon atoms, more preferably a monovalent hydrocarbon group having 1 to 10 carbon atoms. Specific examples of such a substituted or unsubstituted monovalent hydrocarbon group include alkyl groups such as a methyl group, an ethyl group, a propyl group, a butyl group, a hexyl group, a cyclohexyl group and an octyl group; aryl groups such as a phenyl group and a tolyl group; aralkyl groups such as a benzyl group and a phenylethyl group, or a monovalent hydrocarbon group where some or all hydrogen atoms are substituted with a halogen atom such as a fluorine atom. $R^1$ is preferably a hydrogen atom, a methyl group or a phenyl group.

In the embodiment, examples of the structure of a specific PFPE-containing compound (A) can include the following structures. In the following structures, PFPE$^1$ and $R^{k2}$ have the same meanings as described above.

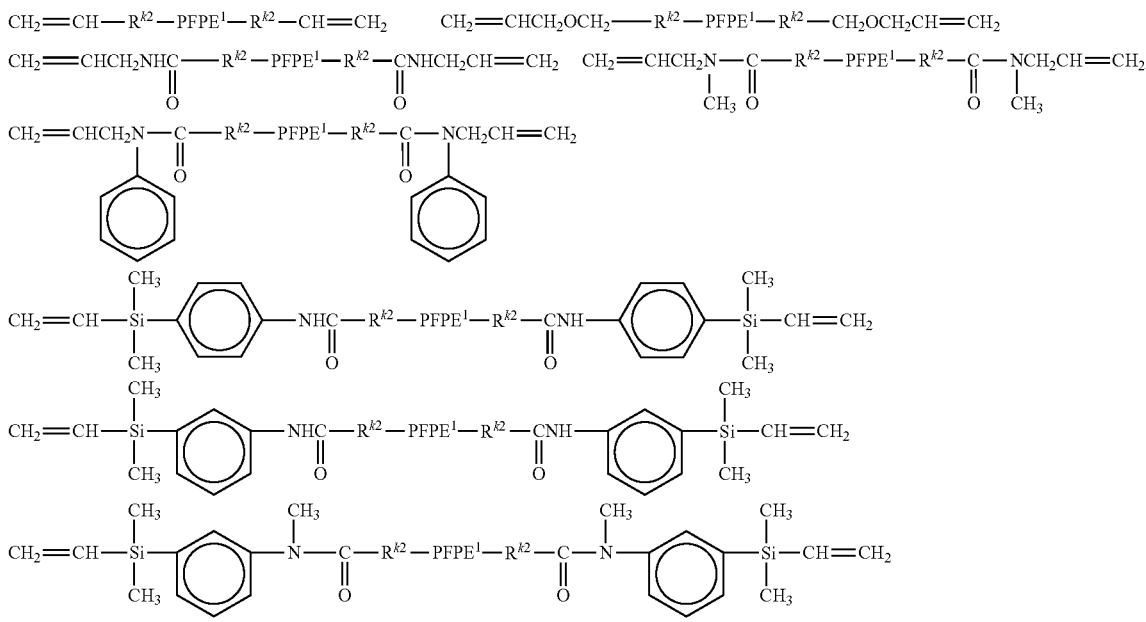

The viscosity (25° C.) of PFPE-containing compound (A) is preferably in the range from 5 to 100,000 mPa·s, more preferably in the range from 100 to 10,000 mPa·s, further preferably in the range from 300 to 3,000 mPa·s. The viscosity can be measured according to JIS K6249. The PFPE-containing compound (A) having such a viscosity, when used for sealing, potting, coating, impregnation or the like, can contribute to formation of a cured product having proper physical characteristics. The range of the viscosity of the PFPE-containing compound (A) can be appropriately selected within the range of the viscosity, depending on the application.

The number average molecular weight of the PFPE-containing compound (A) is preferably in the range from 1,000 to 100,000, more preferably in the range from 2,000 to 20,000. The number average molecular weight of the PFPE-containing compound (A) can be any value measured by $^{19}$F-NMR.

The PFPE-containing compound (A) can be used singly or in combinations of two or more kinds thereof.

The PFPE-containing compound (A) described above can be produced by a known method or an improved method thereof.

The present invention is not limited to the following example, and, for example, the PFPE-containing compound (A), when represented by the following formula:

wherein a —C(=O)NH—$R^{k10}$— portion corresponds to $R^{k1}$, can be synthesized by reacting $CH_3OC(=O)$—$PFPE^1$-$C(=O)OCH_3$ and $CH_2=CHR^{k10}NH_2$.

In one embodiment, the PFPE-containing compound (A) includes no Si—H bond in a molecular chain.

In one embodiment, the PFPE-containing compound (A) includes no Si atom in a molecular chain.

(Organosilicon Compound (B))

The organosilicon compound (B) has two or more hydrogen atoms each bonding to a silicon atom (Si—H), in one molecule. The organosilicon compound (B) can serve as a cross-linking agent or a chain extender of the PFPE-containing compound (A). The organosilicon compound (B) can be included, thereby improving physical properties (for example, tensile strength and elastic modulus) of the curable composition of the present invention.

The Si—H is preferably present at an end of a molecular chain of the organosilicon compound. (B).

The organosilicon compound (B) preferably has two or more silicon atoms each having a Si—H bond, in one molecule.

The organosilicon compound (B) preferably has a fluorine-containing group such as one or more monovalent perfluoroalkyl groups, monovalent perfluorooxyalkyl groups, divalent perfluoroalkylene groups or divalent perfluorooxyalkylene groups, in a molecular structure. Such a structure can be contained to thereby improve miscibility and dispersibility of the organosilicon compound (B) and the PFPE-containing compound (A) included in the curable composition of the present invention, and also improve uniformity of a cured product of the curable composition of the present invention.

The number of carbon atoms in the monovalent perfluoroalkyl group is preferably 1 to 20, more preferably 2 to 10. The perfluoroalkyl group may be linear or branched, and is preferably linear.

The monovalent, perfluorooxyalkyl group is preferably a group represented by Rf—$PFPE^2$-. $PFPE^2$ is represented by formula:

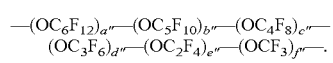

$PFPE^2$ may be linear or branched, and is preferably linear.

In the formula, a", b", c" and d" are each independently an integer of 0 or more and 30 or less, e" and f" are each independently an integer of 1 or more and 200 or less. Preferably, the sum of a", b", c", d", e" and f" is 5 or more, more preferably 10 or more, for example, 10 or more and 200 or less. The occurrence order of the respective repeating units in parentheses with the subscript a", b", c", d", e" or f" is not limited in the formula. The ratio of e" to f" is 1.0 or more.

Here, a", b", c", d", e" and f" can have the same meanings as a, b, c, d, e and f of $PFPE^1$, respectively. Examples of specific structures of the respective repeating units contained in $PFPE^2$ can include those exemplified as the respective repeating units of $PFPE^1$.

Preferably, $PFPE^2$ is $-(OC_4F_8)_{c''}-(OC_3F_6)_{d''}-(OC_2F_4)_{e''}-(OCF_2)_{f''}-$, wherein c" and d" are each independently an integer of 0 or more and 30 or less, e" and f" are each independently an integer of 1 or more and 200 or less, preferably 5 or more and 200 or less, more preferably 10 or more and 200 or less, and the occurrence order of the respective repeating units in parentheses with the subscript c", d", e" or f" is not limited in the formula. Preferably, $PFPE^2$ is $-(OCF_2CF_2CF_2CF_2)_{c''}-(OCF_2CF_2CF_2)_{d''}-(OCF_2CF_2)_{e''}-(OCF_2)_{f''}-$. In one embodiment, $PFPE^2$ may be $-(OC_2F_4)_{e''}-(OCF_2)_{f''}-$, wherein e" and f" are each independently an integer of 1 or more and 200 or less, preferably 5 or more and 200 or less, more preferably 10 or more and 200 or less, and the occurrence order of the respective repeating units in parentheses with the subscript e" or f" is not limited in the formula.

In the formulae, each Rf, at each occurrence, independently represents a chlorine atom, a fluorine atom, or an alkyl group having 1 to 16 carbon atoms, the group being optionally substituted with one or more fluorine atoms or chlorine atoms.

The "alkyl group having 1 to 16 carbon atoms" with respect to the alkyl group having 1 to 16 carbon atoms, the group being optionally substituted with one or more fluorine atoms, is optionally linear or branched, is preferably a linear or branched alkyl group having 1 to 6 carbon atoms, particularly 1 to 3 carbon atoms, more preferably a linear alkyl group having 1 to 3 carbon atoms.

Rf is preferably a fluorine atom, or an alkyl group having 1 to 16 carbon atoms, the group being optionally substituted with one or more fluorine atoms, more preferably a $CF_2H-C_{1-15}$ fluoroalkylene group or a $C_{1-16}$ perfluoroalkyl group, further preferably a $C_{1-16}$ perfluoroalkyl group.

The perfluoroalkyl group having 1 to 16 carbon atoms may be linear or branched, and is preferably a linear or branched perfluoroalkyl group having 1 to 6 carbon atoms, in particular, 1 to 3 carbon atoms, more preferably a linear perfluoroalkyl group having 1 to 3 carbon atoms, specifically $-CF_3$, $-CF_2CF_3$, or $-CF_2CF_2CF_3$.

Preferably, the monovalent perfluorooxyalkyl group is $Rf-(OC_2F_4)_{e''}-(OCF_2)_{f''}-$, wherein e" and f" are each independently an integer of 1 or more and 200 or less, preferably 5 or more and 200 or less, more preferably 10 or more and 200 or less, and the occurrence order of the respective repeating units in parentheses with the subscript e" or f" is not limited in the formula.

The ratio of e" to f" in the monovalent perfluorooxyalkyl group is preferably 1.0 or more, more preferably 1.1 or more, further preferably 1.2 or more, and preferably 10.0 or less, more preferably 5.0 or less, further preferably 2.0 or less, particularly preferably 1.5 or less.

The ratio of e" to f" in the monovalent perfluorooxyalkyl group is preferably 1.0 or more and 10.0 or less, more preferably 1.0 or more and 5.0 or less, further preferably 1.0 or more and 2.0 or less, particularly preferably 1.0 or more and 1.5 or less.

The number of carbon atoms in the divalent perfluoroalkylene group is preferably 1 to 20, more preferably 2 to 10. The perfluoroalkylene group may be linear or branched, and is preferably linear.

The divalent perfluorooxyalkylene group is preferably represented by $-PFPE^2-$, and is more preferably a group represented by $-(OC_4F_8)_{c''}-(OC_3F_6)_{d''}-(OC_2F_4)_{e''}-(OCF_2)_{f''}-$. Here, c", d", e", and f" have the same meanings as described above. The perfluorooxyalkyl group may be linear or branched, and is preferably linear. $PFPE^2$ has the same meaning as described above.

The fluorine-containing group is preferably the monovalent perfluoroalkyl group or the divalent perfluoroalkylene group.

The fluorine-containing group and a silicon atom may be connected by a divalent organic group. The divalent organic group has the same meaning as described above.

For example, the divalent organic group may be any of an alkylene group, an arylene group, and a combination thereof, or may be such a group with an ether bond oxygen atom, an amide bond, a carbonyl bond, or the like interposed. Examples of such a divalent organic group include groups having 2 to 12 carbon atoms, such as $-CH_2CH_2-$,
$-CH_2CH_2CH_2-$,
$-CH_2CH_2CH_2OCH_2-$,
$-CH_2CH_2CH_2-NH-CO-$,
$-CH_2CH_2CH_2-N(Ph)-CO-$ (provided that Ph is a phenyl group.),
$-CH_2CH_2CH_2-N(CH_3)-CO-$,
$-CH_2CH_2CH_2-O-CO-$. A left portion of the divalent organic group is bonding to a Si atom and a right portion of the divalent organic group is bonding to a fluorine-containing group, respectively.

In the organosilicon compound (B), examples of any group which is a monovalent substituent bonding to a silicon atom and which is other than the fluorine-containing group include substituted or unsubstituted hydrocarbon groups each having 1 to 20 carbon atoms such as alkyl groups such as a methyl group, an ethyl group, a propyl group, a butyl group, a hexyl group, a cyclohexyl group, an octyl group and a decyl group; alkenyl groups such as a vinyl group and an allyl group; aryl groups such as a phenyl group, a tolyl group and a naphthyl group; aralkyl groups such as a benzyl group and a phenylethyl group, and a group thereof where at least some or all hydrogen atoms of such a group are substituted with a chlorine atom, a cyano group or the like, such as a chloromethyl group, a chloropropyl group and a cyanoethyl group.

Preferably, the organosilicon compound (B) does not have any alkoxy group and epoxy group as a substituent bonding to a silicon atom.

The organosilicon compound (B) may be a cyclic, linear or three-dimensional network compound, or a combination thereof.

The number of silicon atoms included in the organosilicon compound (B) is not limited, and can be usually 2 to 60, preferably about 3 to 30.

Examples of the organosilicon compound (B) can include the following compounds. Such a compound may be used singly or in combinations of two or more kinds thereof.

In the following formulae:
each $PFPE^2$, at each occurrence, independently has the same meaning as described above (in the following formulae, a group represented by $PFPE^2$ is bonding to a group represented by Rf on an oxygen atom at an end);
each Rf, at each occurrence, independently has the same meaning as described above;
each $R^{k3}$, at each occurrence, is independently an alkyl group having 1 to 10 carbon atoms or an alkoxy group represented by $OR^{k7}$, preferably a methyl group or an alkoxy group represented by $OR^{k7}$, more preferably a methyl group;

each $R^{k4}$, at each occurrence, is independently a hydrogen atom, an alkyl group having 1 to 10 carbon atoms or an alkoxy group represented by $OR^{k7}$, preferably a hydrogen atom or an alkoxy group represented by $OR^{k7}$, more preferably a hydrogen atom;

each $R^{k5}$, at each occurrence, is independently a hydrogen atom, an alkyl group having 1 to 10 carbon atoms or an alkoxy group represented by $OR^{k7}$, preferably a hydrogen atom or an alkoxy group represented by $OR^{k7}$, more preferably a hydrogen atom;

each $R^{k6}$, at each occurrence, is independently a hydrogen atom, a fluorine atom, or an alkylene group where one or more hydrogen atoms are each substituted with a fluorine atom, preferably a hydrogen atom;

each $R^{k7}$, at each occurrence, is independently an alkyl group having 1 to 10 carbon atoms, preferably an alkylene group having 1 to 6 carbon atoms;

the number of carbon atoms contained in the alkylene group where one or more hydrogen atoms are each substituted with a fluorine atom is preferably 1 to 8, more preferably 1 to 6;

$R^{k8}$ is represented by $-(O-(CH_2)_{\alpha 5})_{\alpha 6}-$ (where an oxygen atom is bonding to a group represented by $-(CR^{k6}_2)_{\alpha 1}$);

each $\alpha 1$, at each occurrence, is independently an integer of 1 to 10, preferably 2 or 3;

each 2, at each occurrence, is independently an integer of 1 to 50, preferably 10;

each $\alpha 3$, at each occurrence, s independently an integer of 1 to 50, preferably an integer of 3 to 5;

each $\alpha 4$, each occurrence, is independently an integer of 1 to 50, preferably an integer of 3 to 5;

each $\alpha 5$ is an integer of 1 to 5, preferably 1 to 3, more preferably 1; and $\alpha 6$ is 0 or 1.

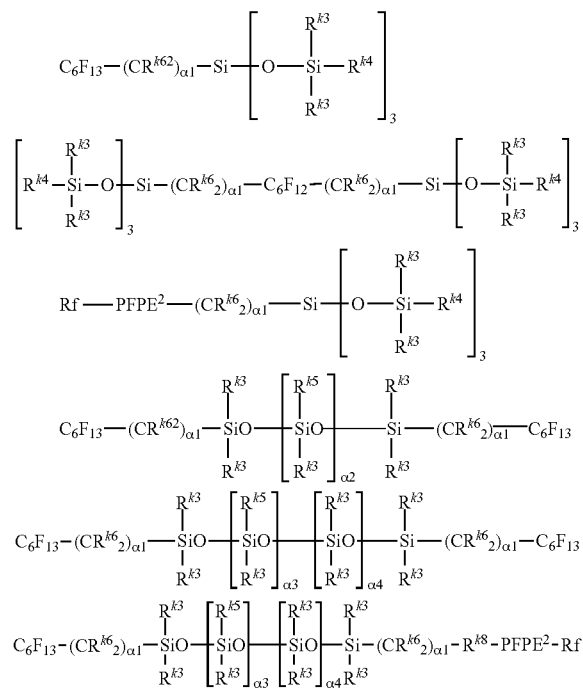

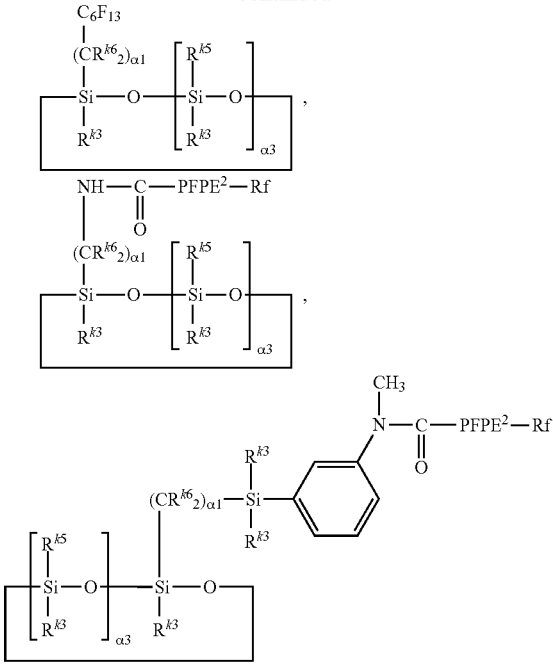

The content of the organosilicon compound (B) can be an amount effective for curing the PFPE-containing compound (A). The content of the organosilicon compound (B) is preferably in the range from 0.5 to 5.0 mol, more preferably in the range from 0.8 to 3.0 mol in terms of a hydrogen atom bonding to a silicon atom contained in the organosilicon compound (B) (hydrosilyl group, namely, SiH group) based on 1 mol of an alkenyl group contained in the PFPE-containing compound (A). The curable composition of the present invention can include such a content of the organosilicon compound (B) to thereby contribute to formation of a cured product having an appropriate degree of crosslinking, and prevent foaming when it is cured.

(Catalyst (C))

The curable composition of the present invention further includes a catalyst (hereinafter, sometimes referred to as "catalyst (C)"). The catalyst (C) can serve as a hydrosilylation reaction catalyst. Such a hydrosilylation reaction catalyst promotes an addition reaction of an alkenyl group in the PFPE-containing compound (A) and a hydrogen atom bonding to a silicon atom (hydrosilyl group) in the organosilicon compound (B).

The catalyst (C) here used is preferably a transition metal catalyst. The transition metal contained in the catalyst (C) is preferably at least one selected from the group consisting of platinum, rhodium, ruthenium, iridium and palladium.

Platinum or a platinum compound is preferably used as the catalyst (C). Such a catalyst (C) has the advantages of a reduction in catalyst cost and catalyst availability.

Examples of the platinum compound can include hydrogen chloroplatinate or a complex of hydrogen chloroplatinate and olefin such as ethylene, a complex thereof with alcohol or vinylsiloxane, and metallic platinum carried on silica, alumina, carbon or the like.

Examples of the catalyst containing rhodium, ruthenium, iridium or palladium can include $RhCl(PPh_3)_3$, $RhCl(CO)(PPh_3)_2$, $Ru_3(CO)_{12}$, $IrCl(CO)(PPh_3)_2$ and $Pd(PPh_3)_4$. In the formulae, Ph is a phenyl group.

The catalyst (C) can be used in the form of a solid when the catalyst is a solid, and hydrogen chloroplatinate or a complex, dissolved in a proper solvent, is preferably used with being miscible with the PFPE-containing compound (A) in order to provide a more uniform cured product.

The catalyst may be included in the curable composition of the present invention in an effective amount so as to be able to contribute to a reaction, for example, in an effective amount so as to be able to contribute to a reaction with serving as a hydrosilylation reaction catalyst. The content of the catalyst can be appropriately increased or decreased depending on a desired curing rate. The content of the catalyst is usually preferably 0.1 to 500 ppm by mass (in terms of metal atom) relative to the PFPE-containing compound (A).

(Organosilicon Compound (D))

The curable composition of the present invention can further include an organosilicon compound which has one or more hydrolyzable groups each bonding to a silicon atom in one molecule (hereinafter, sometimes referred to as "organosilicon compound (D)"). The organosilicon compound which has one or more hydrolyzable groups each bonding to a silicon atom in one molecule can serve as an adhesion-imparting agent which can impart self-adhesiveness in the composition.

The "hydrolyzable group" herein means a group which can undergo a hydrolysis reaction, namely, means a group which can be removed from a main backbone of the compound in a hydrolysis reaction. Examples of the hydrolyzable group include —OR, —OCOR, —O—N=CR$_2$, —NR$_2$, —NHR and halogen, wherein R represents a substituted or unsubstituted alkyl group having 1 to 4 carbon atoms, and —OR (namely, an alkoxy group) is preferable and an alkoxy group is more preferable. Examples of R include unsubstituted alkyl groups such as a methyl group, an ethyl, group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and, may be generated by hydrolyzing the hydrolyzable group. Examples of the halogen can include a fluorine atom, a chlorine atom, a bromine atom and an iodine atom, and in particular, a chlorine atom is preferable.

The organosilicon compound (D) may be used singly or in combinations of two or more kinds thereof.

The organosilicon compound (D) may have one or more monovalent perfluoroalkyl groups or monovalent perfluorooxyalkyl groups. Such a structure can be contained to thereby particularly improve miscibility and dispersibility of the organosilicon compound (D) and the PFPE-containing compound (A) contained in the curable composition, and improve uniformity of a cured product of the curable composition.

The organosilicon compound (D) may have one or more hydrogen atoms each bonding to a silicon atom in one molecule from the viewpoint of addition reactivity with the PFPE-containing compound (A).

The organosilicon compound (D) is preferably organosiloxane or trialkoxysilane having one or more alkoxysilyl groups each bonding to a silicon atom via a carbon atom or a carbon atom and an oxygen atom.

The siloxane backbone of the organosiloxane in the organosilicon compound (D) may be a cyclic, linear or branched backbone, or a combination thereof. The organosiloxane can be the organosiloxane represented by the following general formula.

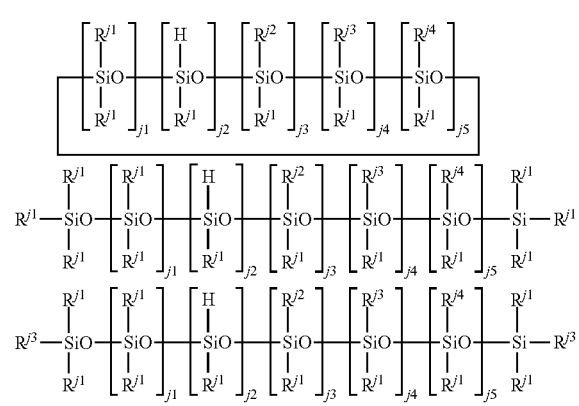

In the general formulae, each j1, at each occurrence, is preferably independently an integer of 0 to 50, more preferably an integer of 0 to 20. In the general formulae, each j2, at each occurrence, is preferably independently an integer of 0 to 50, more preferably an integer of 0 to 20. In the general formulae, each j3, at each occurrence, is preferably independently an integer of 1 to 50, more preferably an integer of 1 to 20. In the general formulae, each j4, at each occurrence, is preferably independently an integer of 0 to 50, more preferably an integer of 0 to 20. In the general formulae, each j5, at each occurrence, is preferably independently an integer of 0 to 50, more preferably an integer of 0 to 20. The sum of j1, j2, j3, j4 and j5 is an integer which allows the weight average molecular weight in terms of polystyrene according to gel permeation chromatography (GPC) to satisfy 500 to 20,000.

In the general formulae, each $R^{j1}$, at each occurrence, is independently a halogen-substituted or unsubstituted monovalent hydrocarbon group. The number of carbon atoms contained in the halogen-substituted or unsubstituted monovalent hydrocarbon group of $R^{j1}$ is preferably in the range from 1 to 10, more preferably in the range from 1 to 8. Specific examples of such a monovalent hydrocarbon group can include alkyl groups such as a methyl group, an ethyl group, a propyl group, a butyl group, a hexyl group, a cyclohexyl group and an octyl group; aryl groups such as a phenyl group and a tolyl group; aralkyl groups such as a benzyl group and a phenylethyl group, or a substituted monovalent hydrocarbon group where some or all hydrogen atoms of these groups are substituted with a halogen atom such as a fluorine atom. In particular, the monovalent hydrocarbon group is more preferably a methyl group.

In the general formulae, $R^{j2}$ represents an alkoxysilyl group bonding to a silicon atom via a carbon atom or a carbon atom and an oxygen atom, and specific examples thereof include —$R^{j5}$—Si(OR$^{j6}$)$_3$, or a group represented by the following formula.

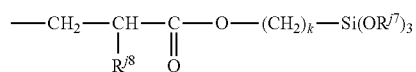

In the formulae, $R^{j5}$ is a divalent hydrocarbon group having 1 to 10 carbon atoms, in particular, 1 to 4 carbon atoms, specifically, an alkylene group such as a methylene group, an ethylene group, a propylene group, a butylene group, a hexylene group, a cyclohexylene group or an octylene group, and $R^{j6}$ is a monovalent hydrocarbon group having 1 to 8 carbon atoms, in particular, 1 to 4 carbon atoms, specifically, for example, an alkyl group such as a methyl group, an ethyl group or a n-propyl group. $R^{j7}$ is a monovalent hydrocarbon group having 1 to 8 carbon atoms, in particular, 1 to 4 carbon atoms, specifically, an alkyl group such as a methyl group, an ethyl group or a n-propyl group, $R^{j8}$ is a hydrogen atom or a methyl group, and k is an integer of 2 to 10.

In the general formulae, $R^{j3}$ is a group represented by the following general formula:

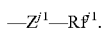

Herein, a right portion of $Z^{j1}$ is bonding to $Rf^{j1}$.

In the formula, $Z^{j1}$ is a group represented by —$(CH_2)_{j6}$—, —$(CH_2)_{j7}$—$X^{j1}$—, wherein $X^{j1}$ is —$OCH_2$—, or —$Y^{j1}$—$NR^{j9}$—$CO$—, wherein $Y^{j1}$ is —$CH_2$— or an o, m or p-dimethylsilylphenylene represented by the following structural formula:

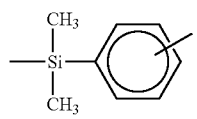

wherein a phenylene group is bonding to a N atom, and $R^{j9}$ is a hydrogen atom, or a substituted or unsubstituted monovalent hydrocarbon group preferably having 1 to 12 carbon atoms, in particular, 1 to 10 carbon atoms, and j6 and j7, at each occurrence, are each independently an integer of 1 to 10, preferably an integer of 1 to 5. In the formulae, $Rf^{j1}$ represents a monovalent perfluoroalkyl group or a monovalent perfluorooxyalkyl group.

The monovalent perfluoroalkyl group or the monovalent perfluorooxyalkyl group has the same meaning as described above.

$R^{j4}$ is an epoxy group bonding to a silicon atom via a carbon atom or a carbon atom and an oxygen atom, and specific examples thereof can include the following groups:

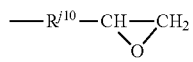

wherein $R^{j10}$ is a divalent hydrocarbon group having 1 to 10 carbon atoms, in particular, 1 to 5 carbon atoms, optionally with an oxygen atom interposed, specifically, an alkylene group such as a methylene group, an ethylene group, a propylene group, a butylene group, a hexylene group, a cyclohexylene group or an octylene group.

Specific examples of the organosiloxane used as the organosilicon compound (D) include any organosiloxane represented by the following structural formula. In the following, a group represented by $PFPE^2$ is bonding to a group represented by Rf, on an oxygen atom at an end.

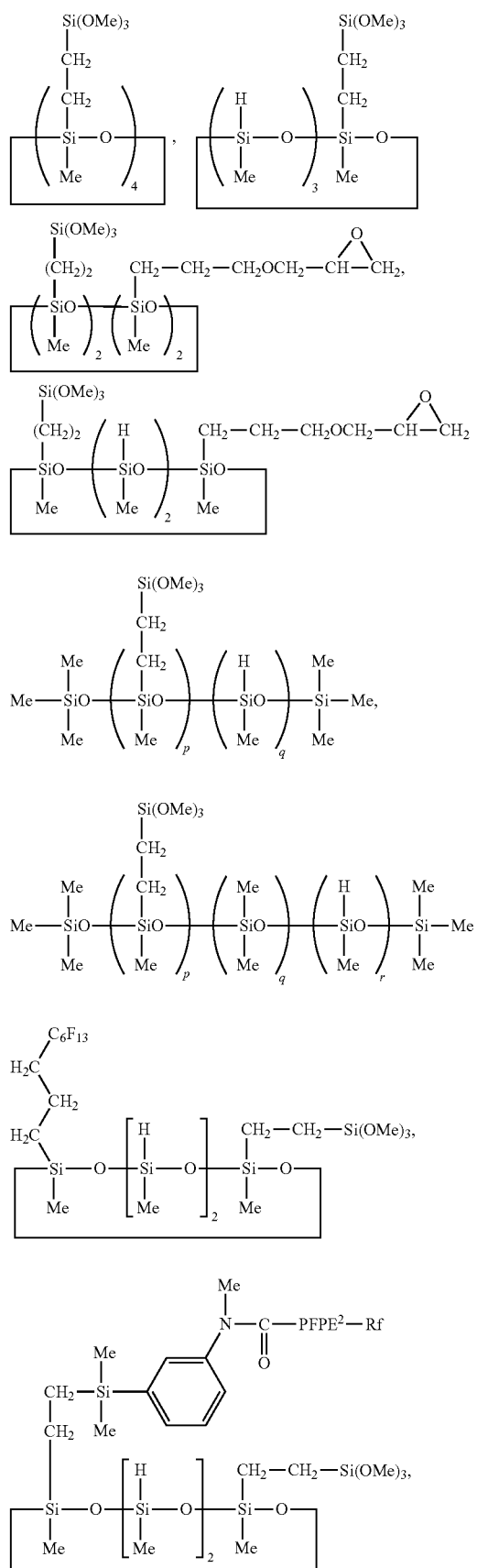

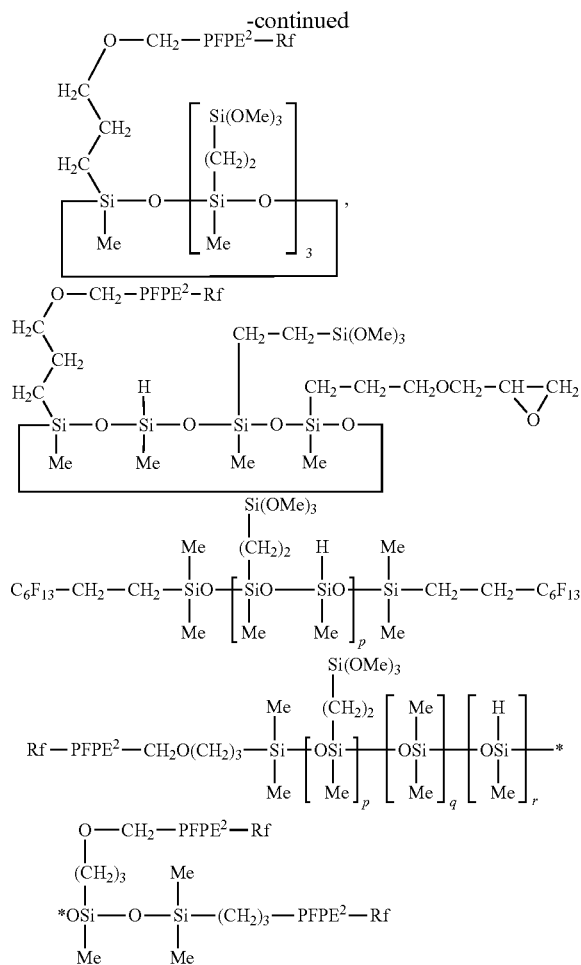

In the formulae, Me represents a methyl group, and p, q and r, at each occurrence, are each independently an integer of 0 or more. PFPE$^2$ and Rf have the same meanings as described above.

The trialkoxysilane used as the organosilicon compound (D) is not limited, and is preferably any silane having a reactive organic group other than an alkoxy group in the same molecule, such as vinyltrimethoxysilane, 3-glycidoxypropyltrimethoxysilane, 3-glycidoxypropyltriethoxysilane, 3-aminopropyltrimethoxysilane, 3-(methacryloxypropyl)trimethoxysilane, 2-(3,4-epoxycyclohexyl)ethyltrimethoxysilane, N-2-(aminoethyl)-3-aminopropyltrimethoxysilane, N-phenyl-3-aminopropyltrimethoxysilane, 3-isocyanatopropyltriethoxysilane, or fluorine-containing trialkoxysilane such as perflucropropyltrimethoxysilane.

The amount of the organosilicon compound (D) compounded is preferably in the range from 0.01 to 10 parts by mass, more preferably in the range from 0.05 to 5 parts by mass based on 100 parts by mass of the PFPE-containing compound (A). The organosilicon compound (D) can be included in the range to thereby allow the curable composition to have sufficient adhesiveness and have appropriate fluidity and curability. Such a curable composition can be favorable in physical hardness.

(Hydrolysis Catalyst)

The curable composition of the present invention can further include a hydrolysis catalyst (hereinafter, sometimes referred to as "hydrolysis catalyst (E)"). The hydrolysis catalyst has a catalyst function for enhancing hydrolyzability of the organosilicon compound (D).

The hydrolysis catalyst is not limited as long as the catalyst does not impair addition curability of the composition, and examples thereof include organotitanium compounds such as titanium tetraisopropoxide, titanium tetra-n-butoxide and titanium tetraacetylacetonate; organozirconium compounds such as zirconium tetra-n-propoxide, zirconium tetra-n-butoxide and zirconium tetraacetylacetonate; organotin compounds such as dibutyltin dilaurate, dibutyltin diacetate and dibutyltin acetylacetonate; organoaluminum compounds such as aluminum trisacetylacetonate, aluminum trisethylacetoacetate and diisopropoxy aluminum ethylacetoacetate; and other acidic catalysts and basic catalysts. In particular, at least one selected from the group consisting of such organotitanium compounds, organozirconium compounds, organotin compounds and organoaluminum compounds is preferably used from the viewpoint of storage stability of the curable composition of the present invention. The hydrolysis catalyst may be used singly or in combinations of two or more kinds thereof.

The amount of the hydrolysis catalyst compounded is preferably in the range from 0.001 to 5 parts by mass, more preferably in the range from 0.01 to 1 part by mass based on 100 parts by mass of the PFPE-containing compound (A). The hydrolysis catalyst can be included in the range in the curable composition of the present invention, thereby exerting a sufficient catalyst effect. The hydrolysis catalyst can be included in the range, thereby allowing the curable composition of the present invention to have appropriate fluidity. The hydrolysis catalyst can also be prevented from being cured into a gel.

(Component (F))

Various additives can be, if necessary, added to the curable composition of the present invention in order to enhance practicality of the composition. For example, organosiloxane (hereinafter sometimes referred to as "component (F)") can be added which acts as an adhesion-imparting agent and which has one or more epoxy groups each bonding to a silicon atom via a carbon atom or a carbon atom and an oxygen atom and no alkoxy group in one molecule.

The component (F) is more preferably one having one or more monovalent perfluoroalkyl groups or monovalent perfluorooxyalkyl groups each bonding to a silicon atom via a carbon atom bonding to a silicon atom or via a carbon atom and an oxygen atom from the viewpoint of miscibility and dispersibility with PFPE-containing compound (A), uniformity after curing of the curable composition, and the like.

The component (F) may have one or more hydrogen atoms each directly bonding to a silicon atom in one molecule from the viewpoint of addition reactivity with the PFPE-containing compound (A).

The siloxane backbone of the organosiloxane of the component (F) can be the same as organosiloxane which can be used as the organosilicon compound (D), and may be a cyclic, linear or branched backbone, or a combination thereof.

The organosiloxane of the component (F) can be organosiloxane represented by the following general formula.

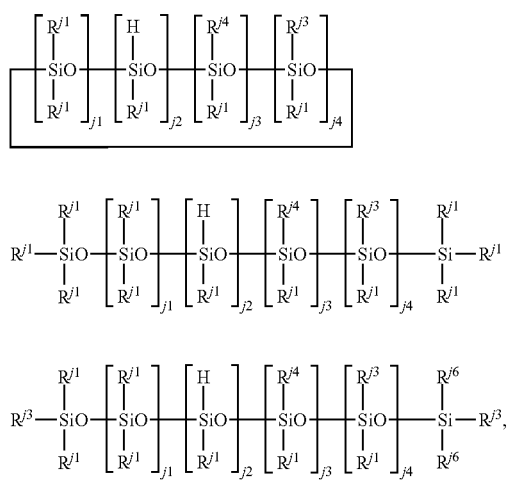

In the formulae, $R^{j1}$, $R^{j6}$, $R^{j3}$, $R^{j4}$, j1, j2, j3 and j4 have the same meanings as described above.

Specific examples of the organosiloxane used in the component (F) include any organosiloxane represented by the following structural formula. Such a compound may be used singly or in combinations of two or more kinds thereof. In the following formulae, Me represents a methyl group, and p, q and r is an integer of 0 or more. Rf" has the same meaning as Rf, and is preferably a fluorine atom. Hereinafter, a group represented by $PFPE^2$ is bonding to a group represented by Rf", on an oxygen atom at an end.

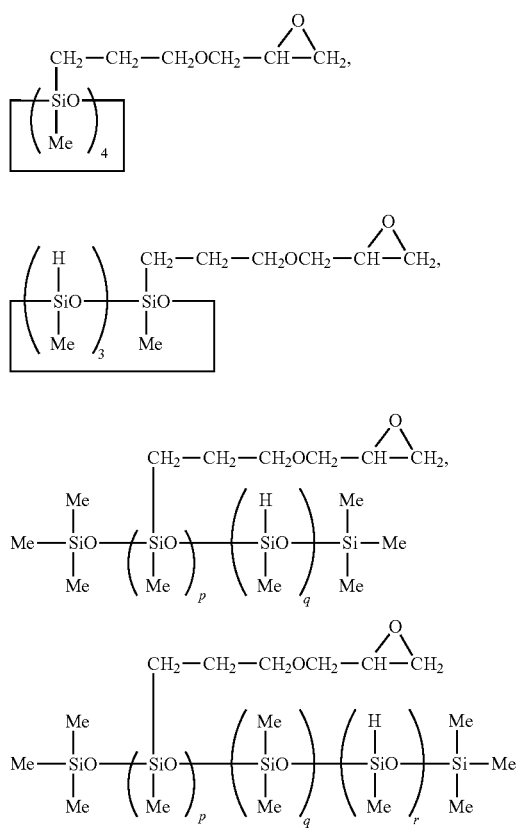

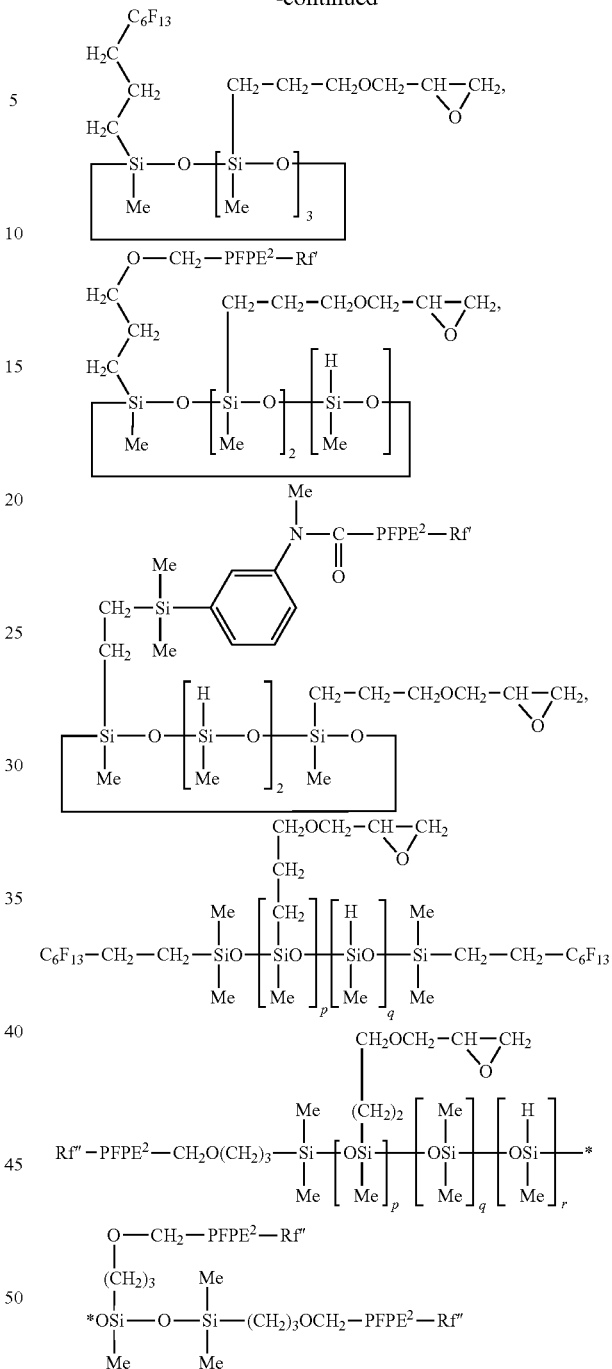

The amount of the component (F) compounded is preferably in the range from 0.01 to 10 parts by mass, more preferably in the range from 0.1 to 5 parts by mass based on 100 parts by mass of the PFPE-containing compound (A). The component (F) can be included in such an amount, thereby allowing the curable composition of the present invention to have particularly sufficient adhesiveness and also allowing the curable composition of the present invention to be particularly favorable in fluidity. The component (F) can be included in such an amount, thereby also allowing the curable composition of the present invention to be favorable in physical strength.

(Other Component)

The curable composition of the present invention may be used together with a solvent. In such a case, the curable composition can be used, with being dissolved in a proper fluorine-based solvent so as to have a desired concentration depending on the application and the intended use. The concentration of the fluorine-based solvent may be, for example, 300 parts by mass or less, 100 parts by mass or less, or 50 parts by mass or less based on 100 parts by mass of the curable composition. When the curable composition and the solvent are used as a mixture, the viscosity of the mixture can be adjusted. When the curable composition is used with the solvent, the handleability of the mixture can be well. Additionally, it may be easy to control the shape of a cured product formed from the curable composition, and, for example, it may be easy to form a cured product in large thickness. When the curable composition is used as the mixture, it may be easy to use the mixture in spray processing or dip processing, and then the degree of freedom in a processing step can be increased.

The solvent here used can also be any fluorine-based solvent selected from the group consisting of perfluorohexane, $CF_3CF_3CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane ((Zeorora H (trade name) or the like), $C_4F_9OCH_3$, $C_4F_3OC_2H_5$, $CF_3CH_2OCF_2CHF_2$, $C_6F_{13}CH=CH_2$, xylene hexafluoride, perfluorobenzene, methylpentadecafluoroheptylketone, trifluoroethanol, pentafluoropropanol, hexafluoroisopropanol, $HCF_2CF_2CH_2OH$, methyltrifluoromethanesulfonate, trifluoroacetic acid, $CF_3O(CF_2CF_2O)_{m1}(CF_2O)_{n1}CF_2CF_3$, wherein m1 and n1 are each independently an integer of 0 or more and 1000 or less and the occurrence order of the respective repeating units in parentheses with m1 or n1 is not limited in the formula, provided that the sum of m1 and n1 is 1 or more, 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,1,3-trifluoro-1-propene, 1,1,1,4,4,4-hexafluoro-2-butene, 1,3-bis(trifluoromethyl)benzene. Fluorinert (manufactured by 3M), perfluorobutyl methyl ether, and perfluorobutyl ethyl ether.

The curable composition of the present invention may further include other component. Such other component is not limited, and may include, for example, various additives such as a (non-reactive) fluoropolyether compound which can be understood as a fluorine containing oil, preferably a perfluoro(poly)ether compound (hereinafter, referred to as "fluorine-containing oil"), a stabilizing material (dehydrating agent, molecular sieve, magnesium sulfate or methyl orthoformate), a viscosity modifier, a filler, a fluorescent agent, a storage stabilizer, a filling agent, a colorant, a heat resistance improved, a cold resistance improved, a rust inhibitor, an adhesiveness improved, a liquid strengthening agent, a plasticizer, a viscosity modifier, a flexibility-imparting agent and an adhesion promoter.

The amount of such an additive compounded is not limited as long as the object of the present invention is not impaired and characteristics of the composition and physical properties of a cured product are not impaired.

The fluorine-containing oil is not limited, and examples thereof include a compound (perfluoro(poly)ether compound) represented by the following general formula (III):

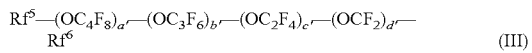
(III)

wherein $Rf^5$ represents an alkyl group having 1 to 16 carbon atoms optionally substituted with one or more fluorine atoms (preferably $C_{1-16}$ perfluoroalkyl group), $Rf^6$ represents an alkyl group having 1 to 16 carbon atoms optionally substituted with one or more fluorine atoms (preferably $C_{1-16}$ perfluoroalkyl group), a fluorine atom or a hydrogen atom, and $Rf^5$ and $Rf^6$ are more preferably, each independently, a $C_{1-3}$ perfluoroalkyl group; and a', b', c' and d' represent the respective four numbers of repeating units in perfluoro(poly)ether constituting a main backbone of the polymer and are mutually independently an integer of 0 or more and 300 or less, the sum of a', b', c' and d' is at least 1, preferably 1 to 300, more preferably 20 to 300, the occurrence order of the respective repeating units in parentheses with the subscript a', b', c' or d' not limited in the formula, and, among such repeating units, $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$ and $—(OCF_2CF(C_2F_5))—$, and is preferably $—(OCF_2CF_2CF_2CF_2)—$ and $—(OCF_2CF(CF_3))—$, and is preferably $—(OCF_2CF_2CF_2)—$, and, for example, $—(OC_2F_6)—$ may be any of $—(OCF_2CF_2)—$ and $—(OCF(CF_3))—$, and is preferably $—(OCF_2CF_2)—$.

Examples of the perfluoro(poly)ether compound represented by general formula (III) include a compound represented by any of the following general formulae (IIIa) and (IIIb) (which may be adopted singly or as a mixture of two or more kinds thereof).

(IIIa)

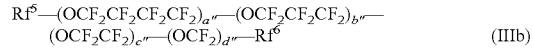
(IIIb)

In such formulae, $Rf^5$ and $Rf^6$ are as described above; in formula (IIIa), b" is an integer of 1 or more and 100 or less; in formula (IIIb), a" and b" are each independently an integer of 1 or more and 30 or less, and c" and d" are each independently an integer of 1 or more and 300 or less, and the occurrence order of the respective repeating units in parentheses with subscript a", b", c", d" is not limited in the formulae.

The fluorine-containing oil may have a number average molecular weight of 1,000 to 30,000. In particular, the number average molecular weight of the compound represented by formula (IIIa) is preferably 2,000 to 8,000. In one embodiment, the number average molecular weight of the compound represented by formula (IIIb) is 3,000 to 8,000. In another embodiment, the number average molecular weight of the compound represented by formula (IIIb) is 8,000 to 30,000.

The curable composition can contain, for example, 0 to 500 parts by mass, preferably 0 to 100 parts by mass, more preferably 1 to 50 parts by mass, further preferably 1 to 5 parts by mass of the fluorine-containing oil based on 100 parts by mass of the PFPE-containing compound (A).

The fluorine-containing oil may be a compound represented by general formula Rf'—F, wherein Rf' is $C_{5-16}$ perfluoroalkyl group, from another viewpoint. The fluorine-containing oil may be a chlorotrifluoroethylene oligomer.

The curable composition can include such a fluorine-containing oil to be thereby formed into a more flexible curing composition.

In one embodiment, the average molecular weight of the fluorine-containing oil may be higher than the average molecular weight of the PFPE-containing compound (A)

(for example, a compound represented by formula (I)). Such an average molecular weight can be set to thereby allow a cured product formed by using the curable composition of the present invention to achieve more excellent friction durability and surface lubricity.

In one embodiment, the average molecular weight of the fluorine-containing oil may be lower than the average molecular weight of the PFPE-containing compound (A) (for example, a compound represented by formula (I)). Such an average molecular weight can be set to thereby allow the curable composition of the present invention to not only be inhibited from being reduced in transparency of a cured product formed by using the curable composition, but also contribute to formation of a cured product having high friction durability and high surface lubricity.

Examples of the storage stabilizer can include methyltrimethoxysilane, methyltripropenoxysilane, vinyltributanoximesilane and methyltriacetoxysilane.

Examples of the filler can include aerosol silica, precipitated silica, titanium dioxide, aluminum oxide, quartz powder, carbon powder, mica, clay, talc and bentonite. The filler, which can be further added, is, for example, fumed silica, colloidal silica, a quartz powder, a fused quartz powder, diatomaceous earth, calcium carbonate or the like (the amount compounded is preferably 0.1 to 50 parts by mass, more preferably 1 to 25 parts by mass based on 100 parts by mass of the PFPE-containing compound (A).); an inorganic pigment such as titanium oxide, iron oxide, carbon black or cobalt aluminate; a heat resistance improved such as titanium oxide, iron oxide, carbon black, cerium oxide, cerium hydroxide, zinc carbonate, magnesium carbonate or manganese carbonate; or a thermal conductivity-imparting agent such as alumina, boron nitride, silicon carbide or a metal powder.

Examples of the filling agent can include fibrous filling agents such as asbestos, glass fiber and an organic fiber.

Examples of the colorant can include a pigment and a dye.

Examples of the heat resistance improved can include colcothar and cerium oxide.

Examples of the adhesiveness improved can include β-(3,4-epoxycyclohexyl)ethyltrimethoxysilane, γ-glycidoxypropyltriethoxysilane, γ-methacryloxypropyltrimethoxysilane, γ-methacryloxypropylmethyldiethoxysilane, N-β-(aminoethyl)-γ-aminopropyltrimetboxysilane, γ-aminopropyltriethoxysilane, γ-chloropropyltrimethoxysilane, γ-mercaptopropyltrimethoxysilane and γ-isocyanatopropyltriethoxysilane.

Examples of the liquid strengthening agent can include reticular polysiloxane having a triorganosiloxy unit and a SiO$_2$ unit.

Examples of a controlling agent of the hydrosilylation reaction catalyst include acetylenic alcohol such as 1-ethynyl-1-hydroxycyclohexane, 3-methyl-1-butyn-3-ol, 3,5-dimethyl-1-hexyn-3-ol, 3-methyl-1-penten-3-ol or phenylbutynol, a reaction product of chlorosilane having the monovalent fluorine-containing substituent with such an acetylenic alcohol, 3-methyl-3-penten-1-yne, 3,5-dimethyl-3-hexen-1-yne, triallyl isocyanurate, polyvinylsiloxane, or an organophosphorus compound, and addition of such a compound enables curing reactivity and storage stability to toe properly kept.

The plasticizer, viscosity modifier and flexibility-imparting agent here used can be each a compound represented toy:

$$Rf\text{—}PFPE^2\text{-}R^{k1}\text{—}CH\text{=}CH_2$$

wherein:
Rf represents an alkyl group having 1 to 16 carbon atoms, optionally substituted with one or more fluorine atoms (preferably, $C_{1-16}$ perfluoroalkyl group), a fluorine atom, or a hydrogen atom, preferably a $C_{1-3}$ perfluoroalkyl group, more preferably a linear perfluoroalkyl group having 1 to 3 cartoon atoms, specifically, —CF$_3$, —CF$_2$CF$_3$ or —CF$_2$CF$_2$CF$_3$;
PFPE$^2$ has the same meaning as described above;
a group represented by PFPE$^2$ is bonding to a group represented by Rf, on an oxygen atom at an end; and
$R^{k1}$ has the same meaning as described above, and is preferably
a single bond,
—CH$_2$—O—CH$_2$—,
—C(=O)—NHCH$_2$—,
—C(=O)—N(Ph)-CH$_2$—,
—C(=O)—NHPh-Si(CH$_3$)$_2$—, or
—C(=O)—N(CH$_3$)Ph-Si(CH$_3$)$_2$—, wherein Ph represents a phenyl group.

In one embodiment, the curable composition of the present invention includes 0.1% by mol or more and 35% by mol or less of a compound represented by formula:

$$Rf\text{—}PFPE^2\text{-}R^{k1}\text{—}CH\text{=}CH_2$$

(hereinafter, also referred to as "component (2)") based on the total of the compound represented by formula (I) (hereinafter, also referred to as "component (1)") and the component (2). The lower limit of the content of the component (2) based on the total of the component (1) and the component (2) is preferably 0.1% by mol, more preferably 0.2% by mol, further preferably 0.5% by mol, still more preferably 1% by mol, particularly preferably 2% by mol, and can be specially 5% by mol. The upper limit of the content of the component (2) based on the total of the component (1) and the component (2) is preferably 35% by mol, more preferably 30% by mol, further preferably 20% by mol, still more preferably 15% by mol, or can be 10% by mol. The content of the component (2) based on the total of the component (1) and the component (2) is preferably 0.1% by mol or more and 30% by mol or less, more preferably 0.1% by mol or more and 20% by mol or less, further preferably 0.2% by mol or more and 10% by mol or less, still more preferably 0.5% by mol or more and 10% by mol or less, particularly preferably 1% by mol or more and 10% by mol or less, for example, 2% by mol or more and 10% by mol or less or 5% by mol or more and 10% by mol or less. The contents of component (1) and the component (2) can be in such ranges to thereby allow the curable composition of the present invention to contribute to formation of a cured product favorable in friction durability.

An adhesion promoter such as carboxylic anhydride or pyromellitic acid tetraallyl ester can be further added to the curable composition of the present invention.

For example, such a composition may be configured as one-liquid type composition where all the components designated as (A) to (E) and the component (F) and other any component are assumed to be one composition or may be configured as a two-liquid type composition where both these components and other any component are mixed in use, depending on the application.

(Application)

A cured product of the curable composition of the present invention can be used in, for example, a potting material or a sealing material. A cured product of the curable composition of the present invention can be used by, for example, filling any void (for example, a bonding section of a housing and a printed board, or a space between a metal terminal section and a mold resin subjected to resin-molding) of an electronic member with the cured product, and drying the resultant after such filling.

The temperature in a treatment (for example, filling and/or drying) using the curable composition of the present invention is not limited as long as the temperature is in the range of 20° C. or more and less than 200° C., and the temperature is preferably in the range of 50° C. or more and less than 180° C.

The curing time of the curable composition of the present invention can be appropriately selected as any time at which a crosslinking reaction and an adhesion reaction to the base material are completed, and can be generally preferably 5 minutes to 24 hours, more preferably 10 minutes to 12 hours.

In order that a cured product (for example, a potting material or a sealing material) having higher abrasion resistance is formed, an object to be treated is preferably washed with acetone, hydrofluoroether or the like and thereafter dried for removal of an oily content on the wall of any void, before the treatment with the curable composition of the present invention. The object can be further subjected to a pre-treatment with UV ozone, oxygen plasma or the like, in addition to the washing, thereby allowing abrasion resistance of the cured product to be more enhanced.

A primer treatment can be, if necessary, applied onto, for example, the wall of any void before the treatment with the curable composition of the present invention, thereby enhancing adhesiveness of a cured product formed from the curable composition and more enhancing abrasion resistance. The primer treatment may be performed in the same conditions as those of a primer treatment with a silane coupling agent, according to an ordinary method.

Herein, various primers can also be used in combination in the case where the cured product obtained from the curable composition of the present invention is allowed to adhere to various base materials.

In one embodiment, the curable composition of the present invention, when use, may be further diluted with a solvent and thus used, depending on the application and the intended use. Any of the fluorine-based solvents exemplified above can be used as the solvent for use in the dilution. For example, the composition may be used, with being dissolved in a solvent such as 1,3-bis(trifluoromethyl)benzene, Fluorinert (manufactured by 3M), perfluorobutyl methyl ether or perfluorobutyl ethyl ether so that a desired concentration is achieved. In particular, the solvent is preferably used in the application of thin film coating.

The curable composition of the present invention enables a cured product having favorable adhesiveness to a metal or a plastic base material to be formed, and thus can be useful particularly as an adhesive to be applied to peripherals of electrical and electronic components and peripherals of in-car members. The curable composition of the present invention has a favorable elastic modulus particularly even at a low temperature, and thus can be usefully used in, for example, an automobile member (for example, a sealing material, specifically, a gasket), particularly an automobile member usable in a cool region (for example, −50° C. or less).

A cured product of the curable composition of the present invention is favorable in chemical resistance, acid resistance and base resistance. Such a cured product of the curable composition of the present invention can also be used in a chemical plant or a member for semiconductor manufacturing equipment.

The glass transition temperature of a cured product of the curable composition of the present invention can be a relatively low value. The reason for this is because the curable composition of the present invention includes the compound having the PFPE[1]. The curable composition of the present invention can be used in any application where the composition is used at a relatively low temperature, for example, an automobile member (for example, sealing material, specifically, gasket), particularly an automobile member usable in a cool region (for example, −50° C. or less).

A cured product of the curable composition of the present invention can be inhibited from being increased in elastic modulus at a low temperature. A cured product of the curable composition of the present invention can be inhibited from being increased in, for example, the ratio of the elastic modulus at −50° C. to the elastic modulus at 0° C. The curable composition of the present invention can be used in any application where rubber properties are demanded ever, at a relatively low temperature, for example, a chemical plant, semiconductor manufacturing equipment or the like.

The temperature of 1% decomposition of a cured product of the curable composition of the present invention can be, for example, the same temperature as the temperature of 1% decomposition of a cured product of a composition including a silane compound having $(OCF_2CF(CF_3))_mOCF_2CF_2O(CF(CF_3)CF_2O)_n$ as a perfluoro(poly)ether group. Accordingly, the curable composition of the present invention can be used at a relatively high temperature.

EXAMPLES

The present invention is more specifically described with reference to the following Examples, but is not intended to be limited to such Examples. The occurrence order of repeating units constituting perfluoro(poly)ether is not limited in the present Examples.

Example 1

Preparation of Curable Composition

Compound (B) as a cross-linking agent and a xylene solution containing 2% of a Pt complex of 1,3-divinyl-1,1,3,3-tetramethyldisiloxane as a curing catalyst were weighed in a glass vessel for mixing in amounts of 4 parts by weight and 0.4 parts by weight, respectively, based on 100 parts by weight of perfluoropolyether compound (A), and stirred and mixed, to prepare a curable composition.

Perfluoropolyether Compound (A)

$CH_2=CHCH_2OCH_2CF_2(OC_2F_4)_e-(OCF_3)_f-CF_2CH_2OCH_2CH=CH_2$ wherein e=48, f=37, and e/f=1.3

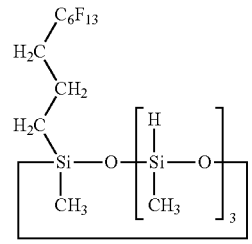

Compound (B)

Production of Test Piece

The curable composition prepared in Example 1 was poured into a mold formed by polytetrafluoroethylene (PTPE), and heated at 150° C. for 1 hour and thus cured, to produce a test piece having a size of 5 mm×200 mm and a thickness of 0.2 mm.

Comparative Example 1

A curable composition was prepared in the same manner as in Example 1 except that perfluoropolyether compound (C) was used instead of perfluoropolyether compound (A).

Perfluoropolyether Compound (C)

$CH_2=CHCH_2OCH_2CF_2(OCF_2CF(CF_3))_mOCF_2CF_2O(CF(CF_3)CF_2O)_n—CF_2CH_2OCH_2CH=CH_2$ wherein, m+n=54

The resulting curable composition was cured to form a test piece and the dynamic viscoelasticity was measured, in the same manner as in Example 1.

Evaluation of Dynamic Viscoelasticity

The test pieces obtained Example 1 and Comparative Example 1 were subjected to dynamic viscoelasticity measurement with a tension-type viscoelasticity measuring system (DMA).

Specifically, liquid nitrogen was used for cooling and the measurement was performed at a frequency of 10 Hz and at a temperature-increasing rate of 2° C./min in the measurement temperature range from −140 to 50° C. The resulting storage elastic modulus was used to calculate the ratio of the elastic modulus at −50° C. to the elastic modulus at 0° C. (Elastic modulus at −50° C./Elastic modulus at 0° C.). The resulting storage elastic modulus plot was used to calculate the glass transition temperature (Tg). The results are shown in Table 1. In Table 1, the "elastic modulus ratio" means a ratio of the "Elastic modulus at −50° C./Elastic modulus at 0° C.".

TABLE 1

|  | Tg° C. | ratio of the elastic modulus |
|---|---|---|
| Example 1 | −107 | 2.5 |
| Comparative Example 1 | −69 | 4.9 |

Comparative Example 2

A curable composition was prepared in the same manner as in Example 1 except that perfluoropolyether compound (D) was used instead of perfluoropolyether compound (A).

Perfluoropolyether Compound (D)

$CH_2=CHCH_2OCH_2CF_2(OC_2F_4)_e—(OCF_2)_f—CF_2CH_2OCH_2CH=CH_2$ wherein e=40, f=58, and e/f=0.7

The resulting curable composition was cured to form a test piece in the same manner as in Example 1.

The Tg of the test piece obtained thereof was −122° C.

Thermogravimetric/Differential Thermal Analysis

The temperature of 1% decomposition of each of the curable compositions obtained in Example 1 and Comparative Examples 1 and 2 was measured with a thermogravimetric/differential thermal analyzer (TG/DTA).

Specifically, 10 mg of a cured product was weighed in an aluminum pan and such measurement was performed with an aluminum oxide powder ($Al_2O_3$) as a reference in the measurement temperature range from 25 to 600° C. at a temperature-increasing rate of 10° C./min under an air atmosphere. The temperature at which the weight was decreased by 1% based on 10 mg of the cured product weighted was defined as the temperature of 1% decomposition. The results are shown in Table 2.

TABLE 2

|  | Temperature of 1% decomposition (° C.) |
|---|---|
| Example 1 | 298 |
| Comparative Example 1 | 313 |
| Comparative Example 2 | 211 |

As shown in Table 1, the cured product of the curable composition obtained in Example 1 had lower Tg, and the rubber property of the cured product was maintained even at a low temperature. It was found that the cured product of the curable composition obtained in Example 1 had lower elastic modulus, and the composition was suitable for the use at a low temperature such as −50° C.

The cured product of the curable composition obtained in Example 1 had a linear PFPE structure and the e/f ratio was 1.0 or more. It was found that the cured product of the curable composition of Example 1 was suitable for the use at lower temperature, and was additionally suitable for the use at higher temperature, because as shown in Table 2, the temperature of 1% decomposition in Example 1 was same as that of the cured product of the curable composition of Comparative Example 1. The curable composition of Comparative Example 1 has a branched structure withstanding at a high temperature, but did not satisfy the e/f ratio of 1.0 or more.

INDUSTRIAL APPLICABILITY

The curable composition of the present invention can be suitably utilized for forming a fluorine-containing sealing material tor embedding any void (for example, a void at a display edge) between electronic members such as a display and a printed board in electronic equipment, and can be used as an adhesive to be applied to peripherals of electrical and electronic components and peripherals of in-car members.

The present invention includes following embodiments:

Embodiment 1

A curable composition comprising:

(A) a compound which is a compound having two or more alkenyl groups and a perfluoro(poly)ether group in one molecule, wherein the perfluoro(poly)ether group is a group represented by formula:

$$—(OC_6F_{12})_a—(OC_5F_{10})_b—(OC_4F_8)_c—(OC_3X^{10}{}_6)_d—(OC_2F_4)_e—(OCF_2)_f—$$

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or a chlorine atom;

(B) an organosilicon compound which has two or more hydrogen atoms each bonding to a silicon atom, in one molecule; and (C) a catalyst.

Embodiment 2

The curable composition according to Embodiment 1, wherein (A) the compound having two or more alkenyl groups and a perfluoro(poly)ether group in one molecule is a compound represented by formula (I):

$$CH_2=CH—R^{k1}—PFPE^1-R^{k1}—CH=CH_2 \quad (I)$$

wherein:

each $R^{k1}$, at each occurrence, independently represents a single bond or a divalent organic group; and each $PFPE^1$, at each occurrence, independently represents

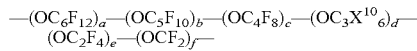

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or a chlorine atom.

Embodiment 3

The curable composition according to Embodiment 1 or 2, wherein a hydrogen atom bonding to a silicon atom in (B) the organosilicon compound which has two or more hydrogen atoms each bonding to a silicon atom, in one molecule, is comprised in the range from 0.5 to 5.0 mol based on 1 mol of an alkenyl group in (A) the compound having two or more alkenyl groups and a perfluoro(poly)ether group in one molecule.

Embodiment 4

The curable composition according to any one of Embodiments 1 to 3, wherein (B) the organosilicon compound which has two or more hydrogen atoms each bonding to a silicon atom, in one molecule, has at least one selected from the group consisting of one or more monovalent perfluoroalkyl groups, monovalent perfluorooxyalkyl groups, divalent perfluoroalkylene groups and divalent perfluorooxyalkylene groups, in a molecular structure.

Embodiment 5

The curable composition according to any one of Embodiments 1 to 4, wherein the catalyst is a transition metal catalyst.

Embodiment 6

The curable composition according to any one of Embodiments 1 to 5, wherein the catalyst comprises at least one comprising platinum, rhodium, ruthenium, iridium and palladium.

Embodiment 7

The curable composition according to any one of Embodiments 1 to 6, wherein the catalyst comprises platinum.

Embodiment 8

The curable composition according to any one of Embodiments 1 to 7, comprising 0.1 to 500 ppm by mass of the catalyst in terms of metal atom relative to (A) the compound having two or more alkenyl groups and a perfluoro(poly)ether group in one molecule.

Embodiment 9

The curable composition according to any one of Embodiments 1 to 8, wherein a ratio of the sum of e and f to the sum of a, b, c, d, e and f is 0.80 or more in (A) the compound having two or more alkenyl groups and a perfluoro(poly)ether group in one molecule.

Embodiment 10

The curable composition according to any one of Embodiments 1 to 9, wherein $X^{10}$ is a fluorine atom.

The invention claimed is:

1. A curable composition for filling a void of an electronic member comprising:

(A) a compound which is a compound having two or more alkenyl groups and a perfluoro(poly)ether group in one molecule is a compound represented by formula (I):

$$CH_2=CH—R^{k1}—PFPE^1-R^{k1}—CH=CH_2 \quad (I), \text{ wherein}$$

each $R^{k1}$, at each occurrence, independently is a single bond, a $C_{1-20}$ alkylene group, $—(CH_2)_{s'}—X^c—$, $—(CH_2)_{s'}—X^c—(CH_2)_{t'}—$, $—X^d—$, $—X^d—(CH_2)_{t'}—$, $—X^f—$, a $—X^f—C_{1-20}$ alkylene group, $—X^f—(CH_2)_{s'}—X^c—$, $—X^f—(CH_2)_{s'}—X^c—(CH_2)_{t'}—$, $—X^f—X^d—$, or $—X^f—X^d—(CH_2)_{t'}—$;

s' is an integer of 1 to 20;

t' is an integer of 1 to 20;

$X^c$ is $—O—$, $—S—$, $—C(O)O—$, $—O—CONR^{34}—$, $—Si(R^{33})_2—$, $—(Si(R^{33})_2O)_{m'}—Si(R^{33})_2—$, $—O—(CH_2)_{u'}—(Si(R^{33})_2O)_{m'}—Si(R^{33})_2—$, $—O—(CH_2)_{u'}—Si(R^{33})_2—O—Si(R^{33})_2—CH_2CH_2—Si(R^{33})_2—O—Si(R^{33})_2—$, $—O—(CH_2)_{u'}—Si(OCH_3)_2OSi(OCH_3)_2—$, $—CONR^{34}—(CH_2)_{u'}—(Si(R^{33})_2O)_{m'}—Si(R^{33})_2—$, $—CONR^{34}—(CH_2)_{u'}—N(R^{34})—$, or $—CONR^{34}$-(o-, m- or p-phenylene)-$Si(R^{33})_2—$;

$X^d$ is $—S—$, $—C(O)O—$, $—CONR^{34}—(CH_2)_{u'}—(Si(R^{33})_2O)_{m'}—Si(R^{33})_2—$, $—CONR^{34}—(CH_2)_{u'}—N(R^{34})—$, or $—CONR^{34}$-(o-, m- or p-phenylene)-$Si(R^{33})_2—$;

each $R^{33}$ is at each occurrence, independently is a phenyl group, a $C_{1-6}$ alkyl group or a $C_{1-6}$ alkoxy group;

each $R^{34}$, at each occurrence, independently is a hydrogen atom, a phenyl group, or a $C_{1-6}$ alkyl group;

m' is at each occurrence, is independently an integer of 1 to 100;

u' is an integer of 1 to 20;

$X^f$ is an alkylene group having $C_{1-6}$ atoms, and optionally substituted with one or more substituents selected from a fluorine atom, a $C_{1-3}$ alkyl group and a $C_{1-3}$ fluoroalkyl group;

$PFPE^1$ is a group represented by formula:

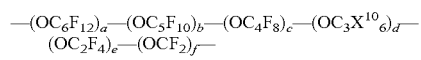

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more and 1.5 or less, and each $X^{10}$, at each occurrence, is independently a hydrogen atom, a fluorine atom or a chlorine atom;

(B) an organosilicon compound which has two or more hydrogen atoms each bonding to a silicon atom, in one molecule; and (C) a catalyst.

2. The curable composition according to claim 1, wherein a hydrogen atom bonding to a silicon atom in (B) the organosilicon compound which has two or more hydrogen atoms each bonding to a silicon atom, in one molecule, is comprised in the range from 0.5 to 5.0 mol based on 1 mol of an alkenyl group in (A) the compound having two or more alkenyl groups and a perfluoro(poly)ether group in one molecule.

3. The curable composition according to claim 1, wherein (B) the organosilicon compound which has two or more hydrogen atoms each bonding to a silicon atom, in one molecule, has at least one selected from the group consisting of one or more monovalent perfluoroalkyl groups, monovalent perfluorooxyalkyl groups, divalent perfluoroalkylene groups and divalent perfluorooxyalkylene groups, in a molecular structure.

4. The curable composition according to claim 1, wherein the catalyst is a transition metal catalyst.

5. The curable composition according to claim 1, wherein the catalyst comprises at least one comprising platinum, rhodium, ruthenium, iridium and palladium.

6. The curable composition according to claim 1, wherein the catalyst comprises platinum.

7. The curable composition according to claim 1, comprising 0.1 to 500 ppm by mass of the catalyst in terms of metal atom relative to (A) the compound having two or more alkenyl groups and a perfluoro(poly)ether group in one molecule.

8. The curable composition according to claim 1, wherein a ratio of the sum of e and f to the sum of a, b, c, d, e and f is 0.80 or more in (A) the compound having two or more alkenyl groups and a perfluoro(poly)ether group in one molecule.

9. The curable composition according to claim 1, wherein $X^{10}$ is a fluorine atom.

* * * * *